United States Patent
Buckley

(10) Patent No.: US 9,607,576 B2
(45) Date of Patent: Mar. 28, 2017

(54) HYBRID SCALAR-VECTOR DITHERING DISPLAY METHODS AND APPARATUS

(71) Applicant: SnapTrack, Inc., San Diego, CA (US)

(72) Inventor: Edward Buckley, Melrose, MA (US)

(73) Assignee: SnapTrack, Inc., San Diego, CA (US)

( * ) Notice: Subject to any disclaimer, the term of this patent is extended or adjusted under 35 U.S.C. 154(b) by 0 days.

(21) Appl. No.: 14/723,035

(22) Filed: May 27, 2015

(65) Prior Publication Data
US 2016/0118020 A1 Apr. 28, 2016

Related U.S. Application Data

(60) Provisional application No. 62/067,287, filed on Oct. 22, 2014.

(51) Int. Cl.
*G09G 5/02* (2006.01)
*G09G 3/20* (2006.01)
(Continued)

(52) U.S. Cl.
CPC ............ *G09G 5/02* (2013.01); *G09G 3/2022* (2013.01); *G09G 3/2044* (2013.01);
(Continued)

(58) Field of Classification Search
CPC combination set(s) only.
See application file for complete search history.

(56) References Cited

U.S. PATENT DOCUMENTS 6,731,407 B1 * 5/2004 Hayama ................. G06K 15/02
  358/3.2
2003/0063107 A1 * 4/2003 Thebault ............... G09G 3/2029
  345/690

(Continued)

FOREIGN PATENT DOCUMENTS

EP 2105913 A2 9/2009

OTHER PUBLICATIONS

Partial International Search Report—PCT/US2015/053995—ISA/EPO—Jan. 8, 2016.
(Continued)

*Primary Examiner* — Wesner Sajous
(74) *Attorney, Agent, or Firm* — Foley & Lardner LLP; Paul S. Hunter; Chase S. Means

(57) ABSTRACT

This disclosure provides systems, methods, and apparatus for generating images on a display using a hybrid scalar-vector dithering process. The hybrid scalar-vector dithering process includes a combination of a scalar dithering process and a vector dithering process. In the scalar dithering process, at least one color subfield is dithered based on the data within just that color subfield. In the vector dithering process, data across multiple color subfields is dithered together. In some implementations, the color subfield processed by the scalar dithering process is a composite color subfield, such as white (W), yellow (Y), cyan (C) and magenta (M). The color subfields processed by the vector dithering process can be component color subfields, such as red (R), green (G), and blue (B) color subfields. In some implementations, an identical dither mask is applied in both the vector and scalar portions of the hybrid scalar-vector dithering process.

29 Claims, 11 Drawing Sheets

(51) Int. Cl.
  *G09G 3/34* (2006.01)
  *H04N 1/52* (2006.01)
  *G06T 11/00* (2006.01)
  *H04N 1/54* (2006.01)
  *H04N 9/31* (2006.01)

(52) U.S. Cl.
  CPC ............ *G09G 3/3433* (2013.01); *G09G 5/026* (2013.01); *H04N 1/52* (2013.01); *H04N 1/54* (2013.01); *H04N 9/3111* (2013.01); *G09G 2310/0235* (2013.01); *G09G 2320/0242* (2013.01); *G09G 2320/0266* (2013.01); *G09G 2340/06* (2013.01); *G09G 2360/16* (2013.01)

(56) References Cited

U.S. PATENT DOCUMENTS

| | | |
|---|---|---|
| 2013/0046803 A1 | 2/2013 | Parmar et al. |
| 2013/0321477 A1 | 12/2013 | Gandhi et al. |
| 2014/0192079 A1 | 7/2014 | Lee et al. |
| 2015/0098120 A1* | 4/2015 | Ji .............................. G09G 5/02 359/261 |
| 2015/0287354 A1* | 10/2015 | Wang ................... G09G 3/2051 345/598 |

OTHER PUBLICATIONS

Fan Z., et al., "Improved Quantization Methods in Color Error Diffusion," Journal of Electronic Imaging, Oct. 1999, vol. 8 (4), pp. 430-438.

Yao Z., et al., "A High Performance Dithering Method for Gray and Color Image Quantization," 2010 6th International Conference on Wireless Communications Networking and Mobile Computing (WiCOM), 2010, pp. 1-4.

International Search Report and Written Opinion—PCT/US2015/053995—ISA/EPO—Mar. 4, 2016.

* cited by examiner

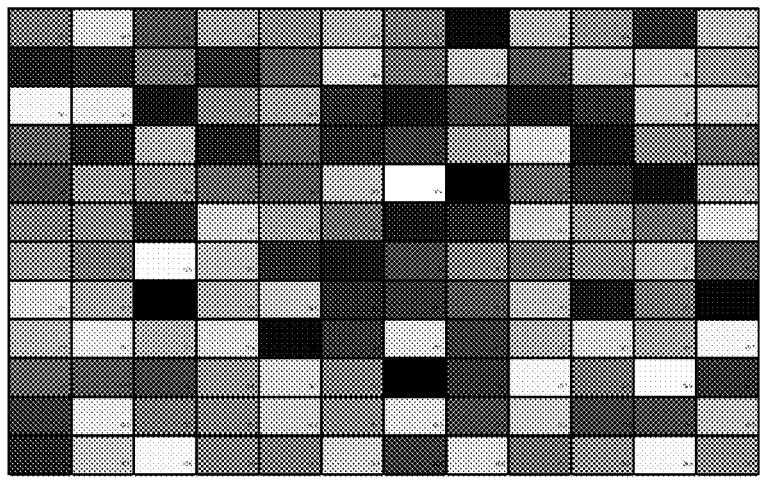
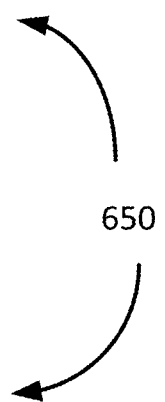
650
FIGURE 6C

CMYK TETRAHEDRON

$$V = \begin{bmatrix} 0 & 1 & 1 \\ 1 & 0 & 1 \\ 1 & 1 & 0 \\ 1 & 1 & 1 \end{bmatrix}$$

$$T^{-1} = \begin{bmatrix} -1 & 0 & 0 \\ 0 & -1 & 0 \\ 0 & 0 & -1 \end{bmatrix}$$

KRGB TETRAHEDRON

$$V = \begin{bmatrix} 1 & 0 & 0 \\ 0 & 1 & 0 \\ 0 & 0 & 1 \\ 0 & 0 & 0 \end{bmatrix}$$

$$T^{-1} = \begin{bmatrix} 1 & 0 & 0 \\ 0 & 1 & 0 \\ 0 & 0 & 1 \end{bmatrix}$$

MYGC TETRAHEDRON

$$V = \begin{bmatrix} 1 & 0 & 1 \\ 1 & 1 & 0 \\ 0 & 1 & 0 \\ 0 & 1 & 1 \end{bmatrix}$$

$$T^{-1} = \begin{bmatrix} 0 & -1 & 0 \\ 1 & 1 & 0 \\ -1 & -1 & -1 \end{bmatrix}$$

RGBM TETRAHEDRON

$$V = \begin{bmatrix} 1 & 0 & 0 \\ 0 & 1 & 0 \\ 0 & 0 & 1 \\ 1 & 0 & 1 \end{bmatrix}$$

$$T^{-1} = \begin{bmatrix} 0 & -1 & -1 \\ 0 & 1 & 0 \\ -1 & -1 & 0 \end{bmatrix}$$

RGMY TETRAHEDRON

$$V = \begin{bmatrix} 1 & 0 & 0 \\ 0 & 1 & 0 \\ 1 & 0 & 1 \\ 1 & 1 & 0 \end{bmatrix}$$

$$T^{-1} = \begin{bmatrix} 0 & -1 & -1 \\ -1 & 0 & 0 \\ 0 & 0 & 1 \end{bmatrix}$$

CMGB TETRAHEDRON

$$V = \begin{bmatrix} 0 & 1 & 1 \\ 1 & 0 & 1 \\ 0 & 1 & 0 \\ 0 & 0 & 1 \end{bmatrix}$$

$$T^{-1} = \begin{bmatrix} 0 & 1 & 1 \\ 1 & 0 & 0 \\ 0 & 0 & -1 \end{bmatrix}$$

FIGURE 7

(12) United States Patent
US 9,607,576 B2

HYBRID SCALAR-VECTOR DITHERING DISPLAY METHODS AND APPARATUS

RELATED APPLICATIONS

The present application for patent claims priority to U.S. Provisional Patent Application No. 62/067,287, entitled "Hybrid Scalar-Vector Dithering Display Methods And Apparatus," filed Oct. 22, 2014, and assigned to the assignee hereof and hereby expressly incorporated by reference herein.

TECHNICAL FIELD

This disclosure relates to the field of imaging displays, and in particular to image dithering processes.

DESCRIPTION OF THE RELATED TECHNOLOGY

Electromechanical systems (EMS) include devices having electrical and mechanical elements, actuators, transducers, sensors, optical components such as mirrors and optical films, and electronics. EMS devices or elements can be manufactured at a variety of scales including, but not limited to, microscales and nanoscales. For example, microelectromechanical systems (MEMS) devices can include structures having sizes ranging from about a micron to hundreds of microns or more. Nanoelectromechanical systems (NEMS) devices can include structures having sizes smaller than a micron including, for example, sizes smaller than several hundred nanometers. Electromechanical elements may be created using deposition, etching, lithography, and/or other micromachining processes that etch away parts of substrates and/or deposited material layers, or that add layers to form electrical and electromechanical devices.

EMS-based display apparatus can include display elements that modulate light by selectively moving a light blocking component into and out of an optical path through an aperture defined through a light blocking layer. Doing so selectively passes light from a backlight or reflects light from the ambient or a front light to form an image.

SUMMARY

The systems, methods and devices of this disclosure each have several innovative aspects, no single one of which is solely responsible for the desirable attributes disclosed herein.

One innovative aspect of the subject matter described in this disclosure can be implemented in an apparatus that includes a controller. The controller is configured to receive an input image frame, generate a first set of color subfields based on the received input image frame, and process the first set of color subfields to obtain a second set of color subfields such that the second set of color subfields includes a larger number of color subfields than the first set of color subfields. The controller is further configured to execute a scalar dithering process on at least one color subfield of the second set of color subfields. In some implementations, the controller utilizes a first dither mask. The controller is further configured to execute a vector dithering process across at least two color subfields of the second set of color subfields. In some implementations, the controller uses a second dither mask. The controller is further configured to cause the dithered second set of color subfields to be output on a display. In some implementations, the first dither mask is identical to the second dither mask.

In some implementations, the at least one color subfield to which the scalar dithering is applied corresponds to a composite color. In some implementations, the composite color is white. In some implementations, the at least two color subfields across which the vector dithering process is applied each correspond to component colors. In some implementations, the second set of color subfields includes a red color subfield, a green color subfield, a blue color subfield, and a white color subfield, and the scalar dithering process is applied to the white color subfield, and the vectoring dithering process is applied across the red, green, and blue color subfields.

In some implementations, generating the second set of color subfields includes quantizing interim pixel intensity values for each color subfield based on a number of subframes to be used to display the respective color subfields. In some implementations, the controller is configured to obtain the interim pixel intensity values by applying a gamut mapping process to the first set of color subfields. In some implementations, generating the second set of color subfields includes calculating remainder values for each of the pixels in the subfields based upon the quantizing of the interim pixel values, and executing the vector dithering process and the scalar dithering process both include processing the remainder values. In some implementations, executing the vector dithering process further includes determining barycentric coordinates of a color defined by the remainders of the color subfields across which the vector dithering process is applied with respect to respective vertices of a tetrahedron within the RGB color cube that encloses the remainder-defined color and comparing values of a cumulative distribution function of the barycentric coordinates to a corresponding value in a dither mask.

In some implementations, the controller is configured to output at least two of the color subfields across which the vector dithering process is applied with different numbers of subframes. In some implementations, the vector dithering process is a multi-level dithering process. In some implementations, the controller is further configured to determine a saturation factor for the received image frame and processing the first set of color subfields to obtain the second set of color subfields includes processing the first color subfields based at least in part on the determined saturation factor.

In some implementations, the apparatus includes a display, which includes an array of display elements, a processor capable of communicating with the display, the processor being capable of processing image data, and a memory device capable of communicating with the processor. In some implementations, the apparatus also includes a driver circuit capable of sending at least one signal to the display, and a second controller capable of sending at least a portion of the image data to the driver circuit. In some implementations, the apparatus further includes an image source module capable of sending the image data to the processor. The image source module includes at least one of a receiver, transceiver, and transmitter. In some implementations, the apparatus includes input device capable of receiving input data and to communicate the input data to the processor.

Another innovative aspect of the subject matter described in this disclosure can be implemented in a method for displaying an image. The method includes receiving an input image frame, generating a first set of color subfields based on the received input image frame, and processing the first set of color subfields to obtain a second set of color subfields such that the second set of color subfields including a larger number of color subfields than the first set of color subfields. The method further includes executing a scalar dithering process on at least one color subfield of the second set of color subfields. In some implementations, the scalar dithering process is executed using a first dither mask. The method further includes executing a vector dithering process across at least two color subfields of the second set of color subfields. In some implementations, the vector dithering process is executed utilizing a second dither mask. The method further includes causing the dithered second set of color subfields to be output on a display. In some implementations, the first dither mask is identical to the second dither mask.

In some implementations, the at least one color subfield to which the scalar dithering is applied corresponds to a composite color, and each of the at least two color subfields across which the vector dithering process is applied correspond to component colors. In some implementations, the second set of color subfields includes a red color subfield, a green color subfield, a blue color subfield, and a white color subfield. In some such implementations, the scalar dithering process is applied to the white color subfield, and the vectoring dithering process is applied across the red, green, and blue color subfields.

In some implementations, generating the second set of color subfields includes quantizing interim pixel intensity values for each color subfield based on a number of subframes to be used to display the respective color subfields. In some implementations, the method further includes obtaining the interim pixel intensity values by applying a gamut mapping process to the first set of color subfields. In some implementations, generating the second set of color subfields includes calculating remainder values for each of the pixels in the subfields based upon the quantizing of the interim pixel values, and executing the vector dithering process and the scalar dithering process both include processing the remainder values. In some implementations, executing the vector dithering process further includes determining barycentric coordinates of a color defined by the remainders of the color subfields across which the vector dithering process is applied with respect to respective vertices of a tetrahedron within the RGB color cube that encloses the remainder-defined color. In some implementations, executing the vector dithering process further includes comparing values of a cumulative distribution function of the barycentric coordinates to a corresponding value in a dither mask.

In some implementations, the at least two of the color subfields across which the vector dithering process is applied are output with different numbers of subframes. In some implementations, the method further includes determining a saturation factor for the received image, frame and processing the first set of color subfields to obtain the second set of color subfields includes processing the first color subfields based at least in part on the determined saturation factor.

Another innovative aspect of the subject matter described in this disclosure can be implemented in a computer readable medium storing instructions, which when executed by a processor, cause the processor to carry out a method for displaying an image. The method includes receiving an input image frame, generating a first set of color subfields based on the received input image frame, and processing the first set of color subfields to obtain a second set of color subfields such that the second set of color subfields including a larger number of color subfields than the first set of color subfields. The method further includes executing a scalar dithering process on at least one color subfield of the second set of color subfields. In some implementations, the scalar dithering process is executed utilizing a first dither mask. The method further includes executing a vector dithering process across at least two color subfields of the second set of color subfields. In some implementations, the vector dithering process is executed utilizing a second dither mask. The method further includes causing the dithered second set of color subfields to be output on a display. In some implementations, the first dither mask is identical to the second dither mask.

In some implementations, the at least one color subfield to which the scalar dithering is applied corresponds to a composite color and the at least two color subfields across which the vector dithering process is applied each correspond to component colors. In some implementations, generating the second set of color subfields includes quantizing interim pixel intensity values for each color subfield based on a number of subframes to be used to display the respective color subfields. In some implementations, the vector dithering process is a multi-level dithering process.

Details of one or more implementations of the subject matter described in this disclosure are set forth in the accompanying drawings and the description below. Other features, aspects, and advantages will become apparent from the description, the drawings and the claims. Note that the relative dimensions of the following figures may not be drawn to scale.

BRIEF DESCRIPTION OF THE DRAWINGS

FIG. 6C shows an example dither mask suitable for use in both the scalar and vector portions of the hybrid-vector dithering process.

FIG. 7 shows example T and V matrices for each of six tetrahedrons of the RGB Cube.

Like reference numbers and designations in the various drawings indicate like elements.

DETAILED DESCRIPTION

Figure 1A:
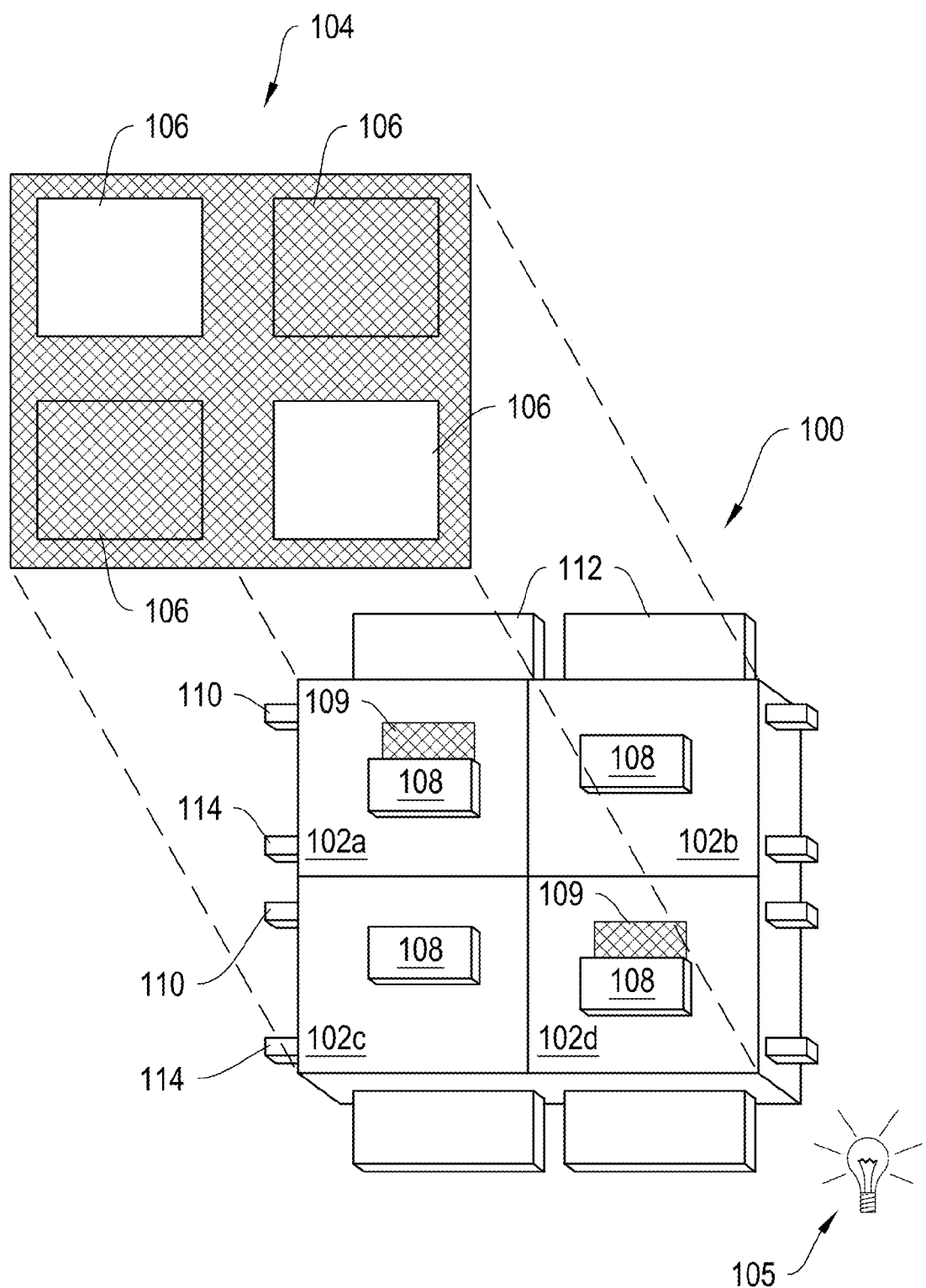
FIG. 1A shows a schematic diagram of an example direct-view microelectromechanical systems (MEMS) based display apparatus.

The following description is directed to certain implementations for the purposes of describing the innovative aspects of this disclosure. However, a person having ordinary skill in the art will readily recognize that the teachings herein can be applied in a multitude of different ways. The described implementations may be implemented in any device, apparatus, or system that is capable of displaying an image, whether in motion (such as video) or stationary (such as still images), and whether textual, graphical or pictorial. The concepts and examples provided in this disclosure may be applicable to a variety of displays, such as liquid crystal displays (LCDs), organic light-emitting diode (OLED) displays, field emission displays, and electromechanical systems (EMS) and microelectromechanical (MEMS)-based displays, in addition to displays incorporating features from one or more display technologies.

The described implementations may be included in or associated with a variety of electronic devices such as, but not limited to: mobile telephones, multimedia Internet enabled cellular telephones, mobile television receivers, wireless devices, smartphones, Bluetooth® devices, personal data assistants (PDAs), wireless electronic mail receivers, hand-held or portable computers, netbooks, notebooks, smartbooks, tablets, printers, copiers, scanners, facsimile devices, global positioning system (GPS) receivers/navigators, cameras, digital media players (such as MP3 players), camcorders, game consoles, wrist watches, wearable devices, clocks, calculators, television monitors, flat panel displays, electronic reading devices (such as e-readers), computer monitors, auto displays (such as odometer and speedometer displays), cockpit controls and/or displays, camera view displays (such as the display of a rear view camera in a vehicle), electronic photographs, electronic billboards or signs, projectors, architectural structures, microwaves, refrigerators, stereo systems, cassette recorders or players, DVD players, CD players, VCRs, radios, portable memory chips, washers, dryers, washer/dryers, parking meters, packaging (such as in electromechanical systems (EMS) applications including microelectromechanical systems (MEMS) applications, in addition to non-EMS applications), aesthetic structures (such as display of images on a piece of jewelry or clothing) and a variety of EMS devices.

The teachings herein also can be used in non-display applications such as, but not limited to, electronic switching devices, radio frequency filters, sensors, accelerometers, gyroscopes, motion-sensing devices, magnetometers, inertial components for consumer electronics, parts of consumer electronics products, varactors, liquid crystal devices, electrophoretic devices, drive schemes, manufacturing processes and electronic test equipment. Thus, the teachings are not intended to be limited to the implementations depicted solely in the Figures, but instead have wide applicability as will be readily apparent to one having ordinary skill in the art.

Display apparatus employing time division gray scale can suffer from image quality degradation resulting from quantization errors that occur during image processing. Dithering processes can mitigate these quantization errors, but can, in some instances, result in the introduction of dither noise that also reduces image quality. For some display apparatus, quantization error can be reduced while introducing limited amounts of dither noise by employing a hybrid scalar-vector dithering process. The hybrid scalar-vector dithering process includes dithering at least one color subfield using a scalar dithering process in which the data in the color subfield is dithered based on the data within just that color subfield, and a vector dithering process in which data is dithered across multiple color subfields. For example, in some implementations, the color subfield processed by the scalar dithering process is a composite color subfield, such as white, yellow, cyan and magenta. The color subfields processed by the vector dithering process can be component color subfields, such as red, green, and blue color subfields. In some implementations, an identical dither mask is applied in both the vector and scalar portions of the hybrid scalar-vector dithering process.

In some implementations, the vectoring dither process includes quantizing each color subfield across which the process is being applied based on the number and weights of the subframes being used to display the color subfields, and corresponding remainder values are determined for each pixel in the respective color subfields. The remainder values are then processed collectively for each pixel with corresponding values in a dither mask to identify color subfields, if any, in which the pixel values should be modified to reduce quantization error. In some implementations, this determination is made for a pixel by identifying the location of a color defined by the remainder values for that pixel within the RGB color cube relative to a set of tetrahedrons into which the RGB color cube can be divided. The position of that remainder-defined color relative to the vertices of the identified tetrahedron can then be processed to identify in which color subfields pixel intensity values are to be modified.

In some implementations, image artifacts are further reduced by controlling the manner in which light energy is output through the composite color subfield in comparison to through the component color subfields. In some implementations, light energy for an image frame is output to the maximum extent possible through the component color subfields. In some implementations, this amount of light output through the composite color subframe is determined based in part on an image saturation parameter determined based on the content of the image frame.

Particular implementations of the subject matter described in this disclosure can be implemented to realize one or more of the following potential advantages. Use of a hybrid scalar-vector dithering process reduces the appearance of quantization errors in time-division gray scale display processes without introducing undue dither noise. In some implementations, the vector dithering process can be flexible to handle color subfields displayed with different and varying numbers of subframes. Mask-based dithering, as employed in the hybrid scalar-vector dithering process also can mitigate the appearance of dither patterns that move with an image than can be introduced with other dither techniques.

By transferring light energy from a composite color subfield to the component color subfields, additional image artifacts, such as dynamic false contouring (DFC), suffered by some displays using composite color subfields, can be reduced, or in some cases eliminated. With reduced DFC, a display can increase its color rate, suppressing other image artifacts, such as color breakup (CBU). With reduced DFC, a display also can avoid image artifacts that arise when using binary-weighted subframes, thus allowing for the formation of higher quality images with fewer subframes per color subfield.

FIG. 1A shows a schematic diagram of an example direct-view MEMS-based display apparatus 100. The display apparatus 100 includes a plurality of light modulators 102a-102d (generally light modulators 102) arranged in rows and columns. In the display apparatus 100, the light modulators 102a and 102d are in the open state, allowing light to pass. The light modulators 102b and 102c are in the closed state, obstructing the passage of light. By selectively setting the states of the light modulators 102a-102d, the display apparatus 100 can be utilized to form an image 104 for a backlit display, if illuminated by a lamp or lamps 105. In another implementation, the apparatus 100 may form an image by reflection of ambient light originating from the front of the apparatus. In another implementation, the apparatus 100 may form an image by reflection of light from a lamp or lamps positioned in the front of the display, i.e., by use of a front light.

In some implementations, each light modulator 102 corresponds to a pixel 106 in the image 104. In some other implementations, the display apparatus 100 may utilize a plurality of light modulators to form a pixel 106 in the image 104. For example, the display apparatus 100 may include three color-specific light modulators 102. By selectively opening one or more of the color-specific light modulators 102 corresponding to a particular pixel 106, the display apparatus 100 can generate a color pixel 106 in the image 104. In another example, the display apparatus 100 includes two or more light modulators 102 per pixel 106 to provide a luminance level in an image 104. With respect to an image, a pixel corresponds to the smallest picture element defined by the resolution of image. With respect to structural components of the display apparatus 100, the term pixel refers to the combined mechanical and electrical components utilized to modulate the light that forms a single pixel of the image.

The display apparatus 100 is a direct-view display in that it may not include imaging optics typically found in projection applications. In a projection display, the image formed on the surface of the display apparatus is projected onto a screen or onto a wall. The display apparatus is substantially smaller than the projected image. In a direct view display, the image can be seen by looking directly at the display apparatus, which contains the light modulators and optionally a backlight or front light for enhancing brightness and/or contrast seen on the display.

Direct-view displays may operate in either a transmissive or reflective mode. In a transmissive display, the light modulators filter or selectively block light which originates from a lamp or lamps positioned behind the display. The light from the lamps is optionally injected into a lightguide or backlight so that each pixel can be uniformly illuminated. Transmissive direct-view displays are often built onto transparent substrates to facilitate a sandwich assembly arrangement where one substrate, containing the light modulators, is positioned over the backlight. In some implementations, the transparent substrate can be a glass substrate (sometimes referred to as a glass plate or panel), or a plastic substrate. The glass substrate may be or include, for example, a borosilicate glass, wine glass, fused silica, a soda lime glass, quartz, artificial quartz, Pyrex, or other suitable glass material.

Each light modulator 102 can include a shutter 108 and an aperture 109. To illuminate a pixel 106 in the image 104, the shutter 108 is positioned such that it allows light to pass through the aperture 109. To keep a pixel 106 unlit, the shutter 108 is positioned such that it obstructs the passage of light through the aperture 109. The aperture 109 is defined by an opening patterned through a reflective or light-absorbing material in each light modulator 102.

The display apparatus also includes a control matrix coupled to the substrate and to the light modulators for controlling the movement of the shutters. The control matrix includes a series of electrical interconnects (such as interconnects 110, 112 and 114), including at least one write-enable interconnect 110 (also referred to as a scan line interconnect) per row of pixels, one data interconnect 112 for each column of pixels, and one common interconnect 114 providing a common voltage to all pixels, or at least to pixels from both multiple columns and multiples rows in the display apparatus 100. In response to the application of an appropriate voltage (the write-enabling voltage, $V_{WE}$), the write-enable interconnect 110 for a given row of pixels prepares the pixels in the row to accept new shutter movement instructions. The data interconnects 112 communicate the new movement instructions in the form of data voltage pulses. The data voltage pulses applied to the data interconnects 112, in some implementations, directly contribute to an electrostatic movement of the shutters. In some other implementations, the data voltage pulses control switches, such as transistors or other non-linear circuit elements that control the application of separate drive voltages, which are typically higher in magnitude than the data voltages, to the light modulators 102. The application of these drive voltages results in the electrostatic driven movement of the shutters 108.

The control matrix also may include, without limitation, circuitry, such as a transistor and a capacitor associated with each shutter assembly. In some implementations, the gate of each transistor can be electrically connected to a scan line interconnect. In some implementations, the source of each transistor can be electrically connected to a corresponding data interconnect. In some implementations, the drain of each transistor may be electrically connected in parallel to an electrode of a corresponding capacitor and to an electrode of a corresponding actuator. In some implementations, the other electrode of the capacitor and the actuator associated with each shutter assembly may be connected to a common or ground potential. In some other implementations, the transistor can be replaced with a semiconducting diode, or a metal-insulator-metal switching element.

Figure 1B:
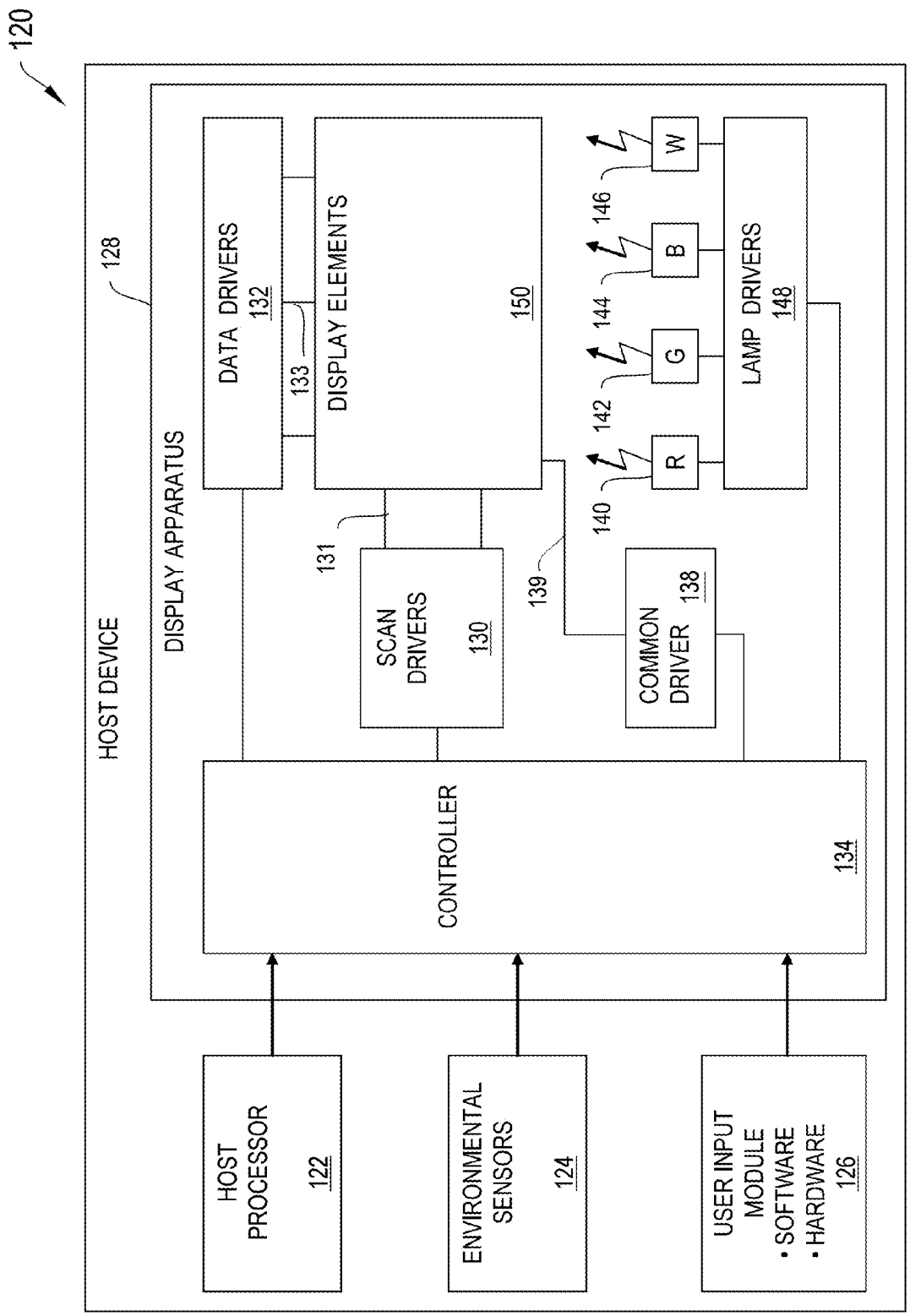
FIG. 1B shows a block diagram of an example host device.

FIG. 1B shows a block diagram of an example host device 120 (i.e., cell phone, smart phone, PDA, MP3 player, tablet, e-reader, netbook, notebook, watch, wearable device, laptop, television, or other electronic device). The host device 120 includes a display apparatus 128 (such as the display apparatus 100 shown in FIG. 1A), a host processor 122, environmental sensors 124, a user input module 126, and a power source.

The display apparatus 128 includes a plurality of scan drivers 130 (also referred to as write enabling voltage sources), a plurality of data drivers 132 (also referred to as data voltage sources), a controller 134, common drivers 138, lamps 140-146, lamp drivers 148 and an array of display elements 150, such as the light modulators 102 shown in FIG. 1A. The scan drivers 130 apply write enabling voltages to scan line interconnects 131. The data drivers 132 apply data voltages to the data interconnects 133.

In some implementations of the display apparatus, the data drivers 132 are capable of providing analog data voltages to the array of display elements 150, especially where the luminance level of the image is to be derived in analog fashion. In analog operation, the display elements are designed such that when a range of intermediate voltages is applied through the data interconnects 133, there results a range of intermediate illumination states or luminance levels in the resulting image. In some other implementations, the data drivers 132 are capable of applying a reduced set, such as 2, 3 or 4, of digital voltage levels to the data interconnects 133. In implementations in which the display elements are shutter-based light modulators, such as the light modulators 102 shown in FIG. 1A, these voltage levels are designed to set, in digital fashion, an open state, a closed state, or other discrete state to each of the shutters 108. In some implementations, the drivers are capable of switching between analog and digital modes.

The scan drivers 130 and the data drivers 132 are connected to a digital controller circuit 134 (also referred to as the controller 134). The controller 134 sends data to the data drivers 132 in a mostly serial fashion, organized in sequences, which in some implementations may be predetermined, grouped by rows and by image frames. The data drivers 132 can include series-to-parallel data converters, level-shifting, and for some applications digital-to-analog voltage converters.

The display apparatus optionally includes a set of common drivers 138, also referred to as common voltage sources. In some implementations, the common drivers 138 provide a DC common potential to all display elements within the array 150 of display elements, for instance by supplying voltage to a series of common interconnects 139. In some other implementations, the common drivers 138, following commands from the controller 134, issue voltage pulses or signals to the array of display elements 150, for instance global actuation pulses which are capable of driving and/or initiating simultaneous actuation of all display elements in multiple rows and columns of the array.

Each of the drivers (such as scan drivers 130, data drivers 132 and common drivers 138) for different display functions can be time-synchronized by the controller 134. Timing commands from the controller 134 coordinate the illumination of red, green, blue and white lamps (140, 142, 144 and 146 respectively) via lamp drivers 148, the write-enabling and sequencing of specific rows within the array of display elements 150, the output of voltages from the data drivers 132, and the output of voltages that provide for display element actuation. In some implementations, the lamps are light emitting diodes (LEDs).

The controller 134 determines the sequencing or addressing scheme by which each of the display elements can be re-set to the illumination levels appropriate to a new image 104. New images 104 can be set at periodic intervals. For instance, for video displays, color images or frames of video are refreshed at frequencies ranging from 10 to 300 Hertz (Hz). In some implementations, the setting of an image frame to the array of display elements 150 is synchronized with the illumination of the lamps 140, 142, 144 and 146 such that alternate image frames are illuminated with an alternating series of colors, such as red, green, blue and white. The image frames for each respective color are referred to as color subframes. In this method, referred to as the field sequential color method, if the color subframes are alternated at frequencies in excess of 20 Hz, the human visual system (HVS) will average the alternating frame images into the perception of an image having a broad and continuous range of colors. In some other implementations, the lamps can employ primary colors other than red, green, blue and white. In some implementations, fewer than four, or more than four lamps with primary colors can be employed in the display apparatus 128.

In some implementations, where the display apparatus 128 is designed for the digital switching of shutters, such as the shutters 108 shown in FIG. 1A, between open and closed states, the controller 134 forms an image by the method of time division gray scale. In some other implementations, the display apparatus 128 can provide gray scale through the use of multiple display elements per pixel.

In some implementations, the data for an image state is loaded by the controller 134 to the array of display elements 150 by a sequential addressing of individual rows, also referred to as scan lines. For each row or scan line in the sequence, the scan driver 130 applies a write-enable voltage to the write enable interconnect 131 for that row of the array of display elements 150, and subsequently the data driver 132 supplies data voltages, corresponding to desired shutter states, for each column in the selected row of the array. This addressing process can repeat until data has been loaded for all rows in the array of display elements 150. In some implementations, the sequence of selected rows for data loading is linear, proceeding from top to bottom in the array of display elements 150. In some other implementations, the sequence of selected rows is pseudo-randomized, in order to mitigate potential visual artifacts. And in some other implementations, the sequencing is organized by blocks, where, for a block, the data for a certain fraction of the image is loaded to the array of display elements 150. For example, the sequence can be implemented to address every fifth row of the array of the display elements 150 in sequence.

In some implementations, the addressing process for loading image data to the array of display elements 150 is separated in time from the process of actuating the display elements. In such an implementation, the array of display elements 150 may include data memory elements for each display element, and the control matrix may include a global actuation interconnect for carrying trigger signals, from the common driver 138, to initiate simultaneous actuation of the display elements according to data stored in the memory elements.

In some implementations, the array of display elements 150 and the control matrix that controls the display elements may be arranged in configurations other than rectangular rows and columns. For example, the display elements can be arranged in hexagonal arrays or curvilinear rows and columns.

The host processor 122 generally controls the operations of the host device 120. For example, the host processor 122 may be a general or special purpose processor for controlling a portable electronic device. With respect to the display apparatus 128, included within the host device 120, the host processor 122 outputs image data as well as additional data about the host device 120. Such information may include data from environmental sensors 124, such as ambient light or temperature; information about the host device 120, including, for example, an operating mode of the host or the amount of power remaining in the host device's power source; information about the content of the image data; information about the type of image data; and/or instructions for the display apparatus 128 for use in selecting an imaging mode.

In some implementations, the user input module 126 enables the conveyance of personal preferences of a user to the controller 134, either directly, or via the host processor 122. In some implementations, the user input module 126 is controlled by software in which a user inputs personal preferences, for example, color, contrast, power, brightness, content, and other display settings and parameters preferences. In some other implementations, the user input module 126 is controlled by hardware in which a user inputs personal preferences. In some implementations, the user may input these preferences via voice commands, one or more buttons, switches or dials, or with touch-capability. The plurality of data inputs to the controller 134 direct the controller to provide data to the various drivers 130, 132, 138 and 148 which correspond to optimal imaging characteristics.

The environmental sensor module 124 also can be included as part of the host device 120. The environmental sensor module 124 can be capable of receiving data about the ambient environment, such as temperature and or ambient lighting conditions. The sensor module 124 can be programmed, for example, to distinguish whether the device is operating in an indoor or office environment versus an outdoor environment in bright daylight versus an outdoor environment at nighttime. The sensor module 124 communicates this information to the display controller 134, so that the controller 134 can optimize the viewing conditions in response to the ambient environment.

Figure 2A:
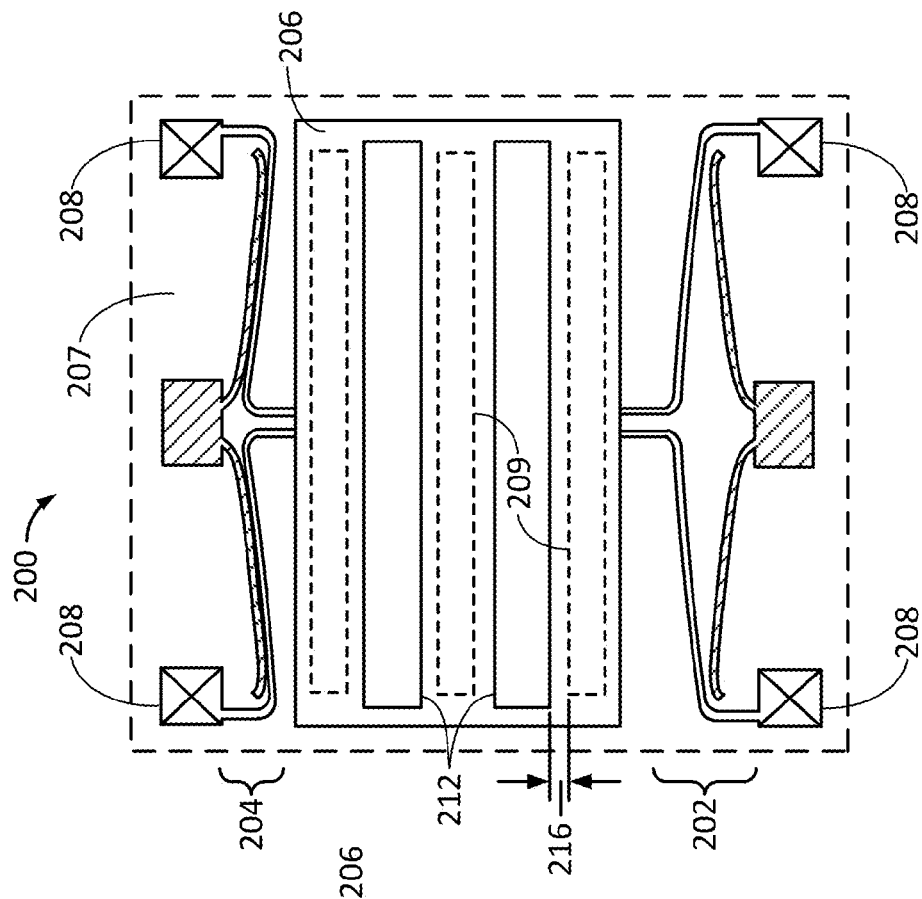
FIGS. 2A and 2B show views of an example dual actuator shutter assembly.
Figure 2B:
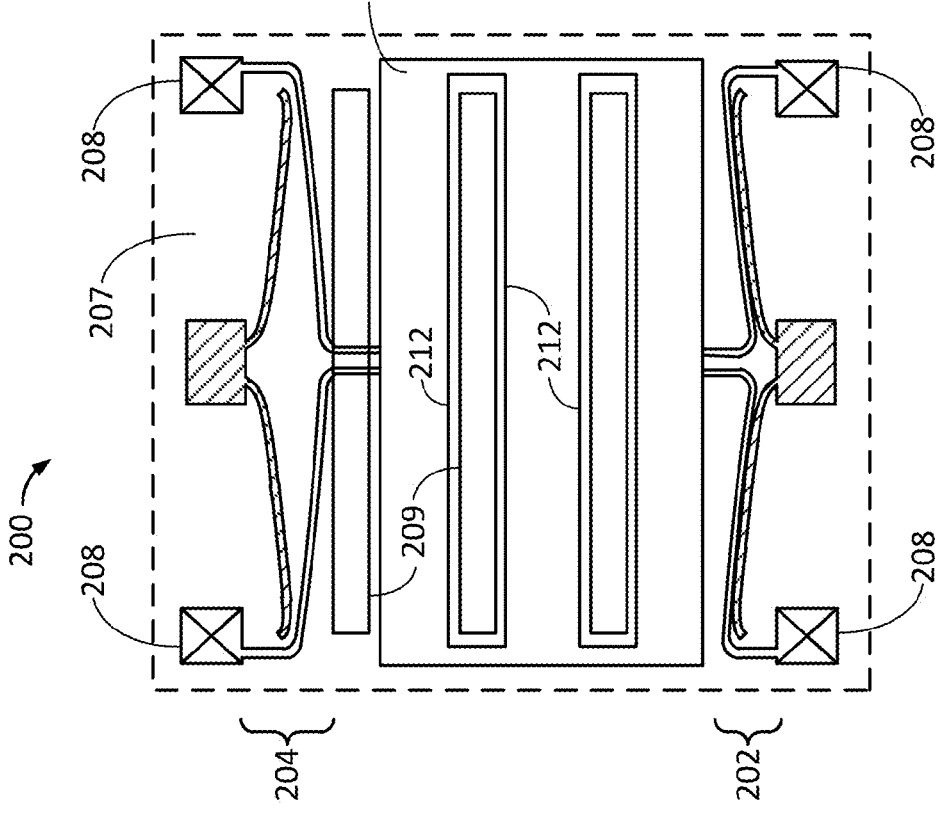

FIGS. 2A and 2B show views of an example dual actuator shutter assembly 200. The dual actuator shutter assembly 200, as depicted in FIG. 2A, is in an open state. FIG. 2B shows the dual actuator shutter assembly 200 in a closed state. The shutter assembly 200 includes actuators 202 and 204 on either side of a shutter 206. Each actuator 202 and 204 is independently controlled. A first actuator, a shutter-open actuator 202, serves to open the shutter 206. A second opposing actuator, the shutter-close actuator 204, serves to close the shutter 206. Each of the actuators 202 and 204 can be implemented as compliant beam electrode actuators. The actuators 202 and 204 open and close the shutter 206 by driving the shutter 206 substantially in a plane parallel to an aperture layer 207 over which the shutter is suspended. The shutter 206 is suspended a short distance over the aperture layer 207 by anchors 208 attached to the actuators 202 and 204. Having the actuators 202 and 204 attach to opposing ends of the shutter 206 along its axis of movement reduces out of plane motion of the shutter 206 and confines the motion substantially to a plane parallel to the substrate (not depicted).

In the depicted implementation, the shutter 206 includes two shutter apertures 212 through which light can pass. The aperture layer 207 includes a set of three apertures 209. In FIG. 2A, the shutter assembly 200 is in the open state and, as such, the shutter-open actuator 202 has been actuated, the shutter-close actuator 204 is in its relaxed position, and the centerlines of the shutter apertures 212 coincide with the centerlines of two of the aperture layer apertures 209. In FIG. 2B, the shutter assembly 200 has been moved to the closed state and, as such, the shutter-open actuator 202 is in its relaxed position, the shutter-close actuator 204 has been actuated, and the light blocking portions of the shutter 206 are now in position to block transmission of light through the apertures 209 (depicted as dotted lines).

Each aperture has at least one edge around its periphery. For example, the rectangular apertures 209 have four edges. In some implementations, in which circular, elliptical, oval, or other curved apertures are formed in the aperture layer 207, each aperture may have a single edge. In some other implementations, the apertures need not be separated or disjointed in the mathematical sense, but instead can be connected. That is to say, while portions or shaped sections of the aperture may maintain a correspondence to each shutter, several of these sections may be connected such that a single continuous perimeter of the aperture is shared by multiple shutters.

In order to allow light with a variety of exit angles to pass through the apertures 212 and 209 in the open state, the width or size of the shutter apertures 212 can be designed to be larger than a corresponding width or size of apertures 209 in the aperture layer 207. In order to effectively block light from escaping in the closed state, the light blocking portions of the shutter 206 can be designed to overlap the edges of the apertures 209. FIG. 2B shows an overlap 216, which in some implementations can be predefined, between the edge of light blocking portions in the shutter 206 and one edge of the aperture 209 formed in the aperture layer 207.

The electrostatic actuators 202 and 204 are designed so that their voltage-displacement behavior provides a bi-stable characteristic to the shutter assembly 200. For each of the shutter-open and shutter-close actuators, there exists a range of voltages below the actuation voltage, which if applied while that actuator is in the closed state (with the shutter being either open or closed), will hold the actuator closed and the shutter in position, even after a drive voltage is applied to the opposing actuator. The minimum voltage needed to maintain a shutter's position against such an opposing force is referred to as a maintenance voltage $V_m$.

Figure 3:
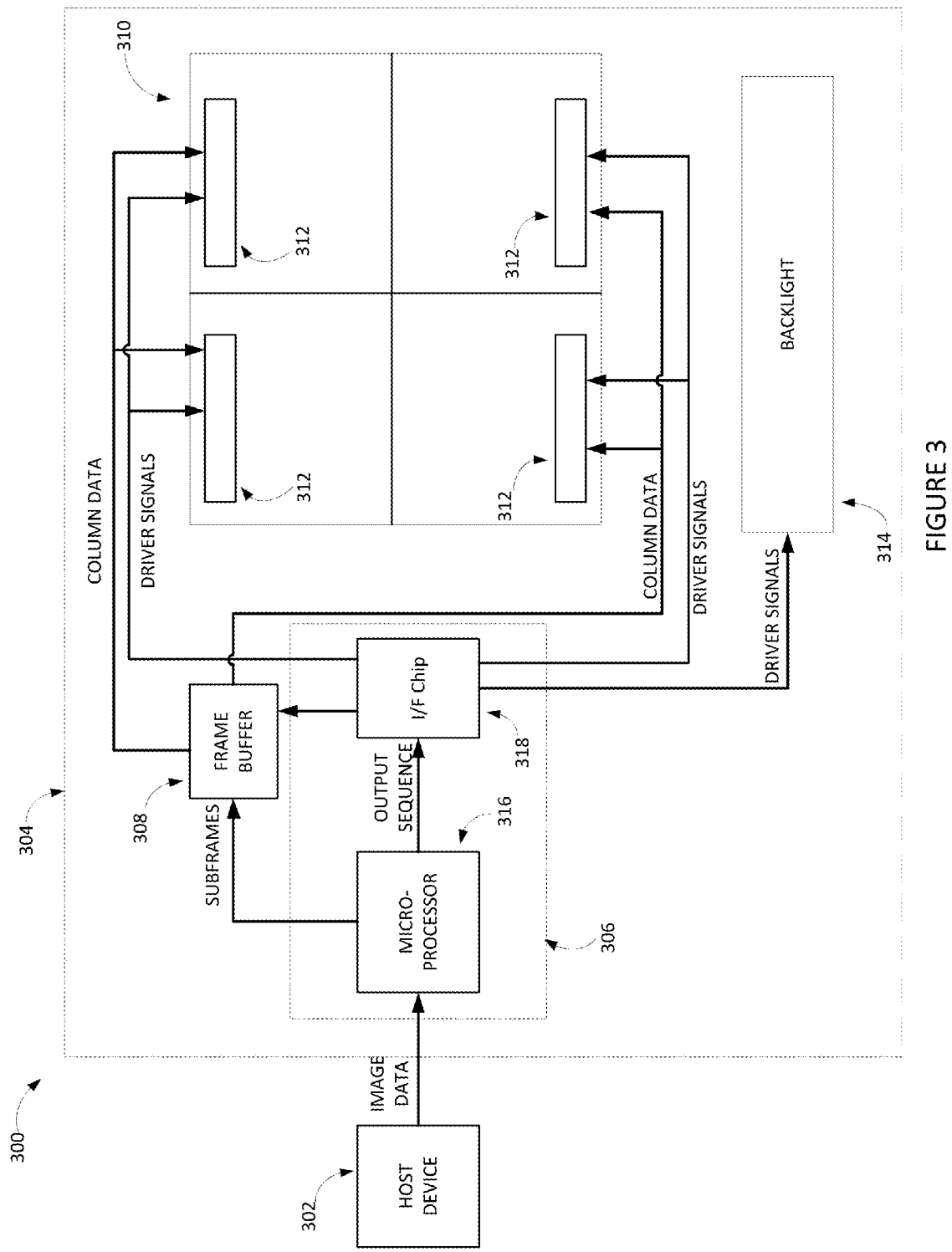
FIG. 3 shows a block diagram of an example display apparatus.

FIG. 3 shows a block diagram of an example display apparatus 300. The display apparatus 300 includes a host device 302 and a display module 304. The host device 302 can be an example of the host device 120 and the display module 304 can be an example of the display apparatus 128, both shown in FIG. 1B. The host device 302 can be any of a number of electronic devices, such as a portable telephone, a smartphone, a watch, a tablet computer, a laptop computer, a desktop computer, a television, a set top box, a DVD or other media player, or any other device that provides graphical output to a display, similar to the display device 40 shown in FIGS. 9A and 9B below. In general, the host device 302 serves as a source for image data to be displayed on the display module 304.

The display module 304 further includes control logic 306, a frame buffer 308, an array of display elements 310, display drivers 312 and a backlight 314. In general, the control logic 306 serves to process image data received from the host device 302 and controls the display drivers 312, array of display elements 310 and backlight 314 to together produce the images encoded in the image data. The control logic 306, frame buffer 308, array of display elements 310, and display drivers 312 shown in FIG. 3 can be similar, in some implementations, to the driver controller 29, frame buffer 28, display array 30, and array drivers 22 shown in FIGS. 9A and 9B, below. The functionality of the control logic 306 is described further below in relation to FIGS. 5-10.

In some implementations, as shown in FIG. 3, the functionality of the control logic 306 is divided between a microprocessor 316 and an interface (I/F) chip 318. In some implementations, the interface chip 318 is implemented in an integrated circuit logic device, such as an application specific integrated circuit (ASIC). In some implementations, the microprocessor 316 is configured to carry out all or substantially all of the image processing functionality of the control logic 306. In addition, the microprocessor 316 can be configured to determine an appropriate output sequence for the display module 304 to use to generate received images. For example, the microprocessor 316 can be configured to convert image frames included in the received image data into a set of image subframes. Each image subframe can be associated with a color and a weight, and includes desired states of each of the display elements in the array of display elements 310. The microprocessor 316 also can be configured to determine the number of image subframes to display to produce a given image frame, the order in which the image subframes are to be displayed, timing parameters associated with addressing the display elements in each subframe, and parameters associated with implementing the appropriate weight for each of the image subframes. These parameters may include, in various implementations, the duration for which each of the respective image subframes is to be illuminated and the intensity of such illumination.

The collection of these parameters (i.e., the number of subframes, the order and timing of their output, and their weight implementation parameters for each subframe) can be referred to as an "output sequence."

The interface chip 318 can be capable of carrying out more routine operations of the display module 304. The operations may include retrieving image subframes from the frame buffer 308 and outputting control signals to the display drivers 312 and the backlight 314 in response to the retrieved image subframe and the output sequence determined by the microprocessor 316. In some other implementations, the functionality of the microprocessor 316 and the interface chip 318 are combined into a single logic device, which may take the form of a microprocessor, an ASIC, a field programmable gate array (FPGA) or other programmable logic device. For example, the functionality of the microprocessor 316 and the interface chip 318 can be implemented by a processor 21 shown in FIG. 9B. In some other implementations, the functionality of the microprocessor 316 and the interface chip 318 may be divided in other ways between multiple logic devices, including one or more microprocessors, ASICs, FPGAs, digital signal processors (DSPs) or other logic devices.

Figure 9A:
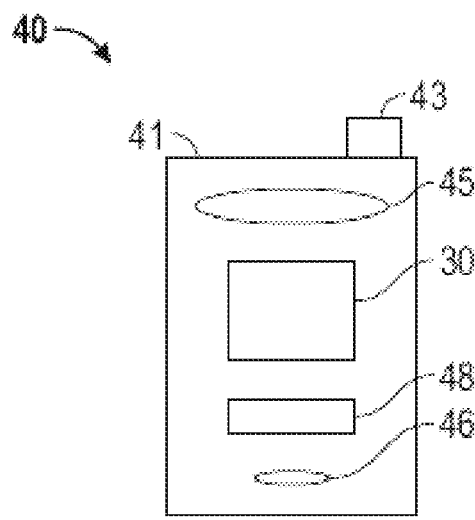
FIGS. 9A and 9B show system block diagrams of an example display device that includes a plurality of display elements.
Figure 9B:
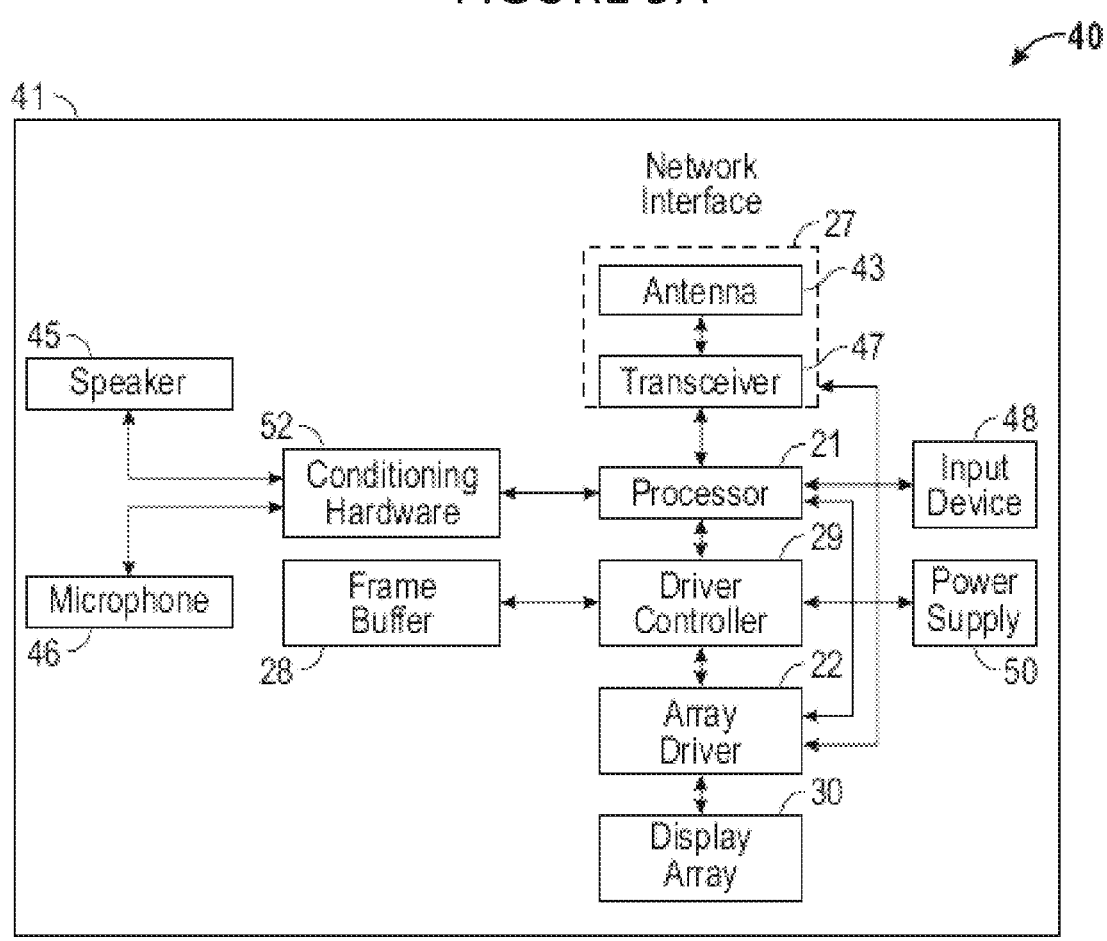

The frame buffer 308 can be any volatile or non-volatile integrated circuit memory, such as DRAM, high-speed cache memory, or flash memory (for example, the frame buffer 308 can be similar to the frame buffer 28 shown in FIG. 9B). In some other implementations, the interface chip 318 causes the frame buffer 308 to output data signals directly to the display drivers 312. The frame buffer 308 has sufficient capacity to store color subfield data and subframe data associated with at least one image frame. In some implementations, the frame buffer 308 has sufficient capacity to store color subfield data and subframe data associated with a single image frame. In some other implementations, the frame buffer 308 has sufficient capacity to store color subfield data and subframe data associated with at least two image frames. Such extra memory capacity allows for additional processing by the microprocessor 316 of image data associated with a more recently received image frame while a previously received image frame is being displayed via the array of display elements 310.

In some implementations, the display module 304 includes multiple memory devices. For example, the display module 304 may include one memory device, such as a memory directly associated with the microprocessor 316, for storing subfield data, and the frame buffer 308 is reserved for storage of subframe data.

The array of display elements 310 can include an array of any type of display elements that can be used for image formation. In some implementations, the display elements can be EMS light modulators. In some such implementations, the display elements can be MEMS shutter-based light modulators similar to those shown in FIG. 2A or 2B. In some other implementations, the display elements can be other forms of light modulators, including liquid crystal light modulators, other types of EMS- or MEMS-based light modulators, or light emitters, such as OLED emitters, configured for use with a time division gray scale image formation process.

The display drivers 312 can include a variety of drivers depending on the specific control matrix used to control the display elements in the array of display elements 310. In some implementations, the display drivers 312 include a plurality of scan drivers similar to the scan drivers 130, a plurality of data drivers similar to the data drivers 132, and a set of common drivers similar to the common drivers 138, as shown in FIG. 1B. As described above, the scan drivers output write enabling voltages to rows of display elements, while the data drivers output data signals along columns of display elements. The common drivers output signals to display elements in multiple rows and multiple columns of display elements.

In some implementations, particularly for larger display modules 304, the control matrix used to control the display elements in the array of display elements 310 is segmented into multiple regions. For example, the array of display elements 310 shown in FIG. 3 is segmented into four quadrants. A separate set of display drivers 312 is coupled to each quadrant. Dividing a display into segments in this fashion can reduce the propagation time needed for signals output by the display drivers to reach the furthest display element coupled to a given driver, thereby decreasing the time needed to address the display. Such segmentation also can reduce the power requirements of the drivers employed.

In some implementations, the display elements in the array of display elements can be utilized in a direct-view transmissive display. In direct-view transmissive displays, the display elements, such as EMS light modulators, selectively block light that originates from a backlight, such as the backlight 314, which is illuminated by one or more lamps. Such display elements can be fabricated on transparent substrates, made, for example, from glass. In some implementations, the display drivers 312 are coupled directly to the glass substrate on which the display elements are formed. In such implementations, the drivers are built using a chip-on-glass configuration. In some other implementations, the drivers are built on a separate circuit board and the outputs of the drivers are coupled to the substrate using, for example, flex cables or other wiring.

The backlight 314 can include a light guide, one or more light sources (such as LEDs), and light source drivers. The light sources can include light sources of multiple colors, such as red, green, blue, and in some implementations white. The light source drivers are capable of individually driving the light sources to a plurality of discrete light levels to enable illumination gray scale and/or content adaptive backlight control (CABC) in the backlight. In addition, lights of multiple colors can be illuminated simultaneously at various intensity levels to adjust the chromaticities of the component colors used by the display, for example to match a desired color gamut. Lights of multiple colors also can be illuminated to form composite colors. For displays employing red, green, and blue component colors, the display may utilize a composite color white, yellow, cyan, magenta, or any other color formed from a combination of two or more of the component colors.

The light guide distributes the light output by light sources substantially evenly beneath the array of display elements 310. In some other implementations, for example for displays including reflective display elements, the display apparatus 300 can include a front light or other form of lighting instead of a backlight. The illumination of such alternative light sources can likewise be controlled according to illumination gray scale processes that incorporate content adaptive control features. For ease of explanation, the display processes discussed herein are described with respect to the use of a backlight. However, it would be understood by a person of ordinary skill that such processes also may be adapted for use with a front light or other similar form of display lighting.

Figure 4:
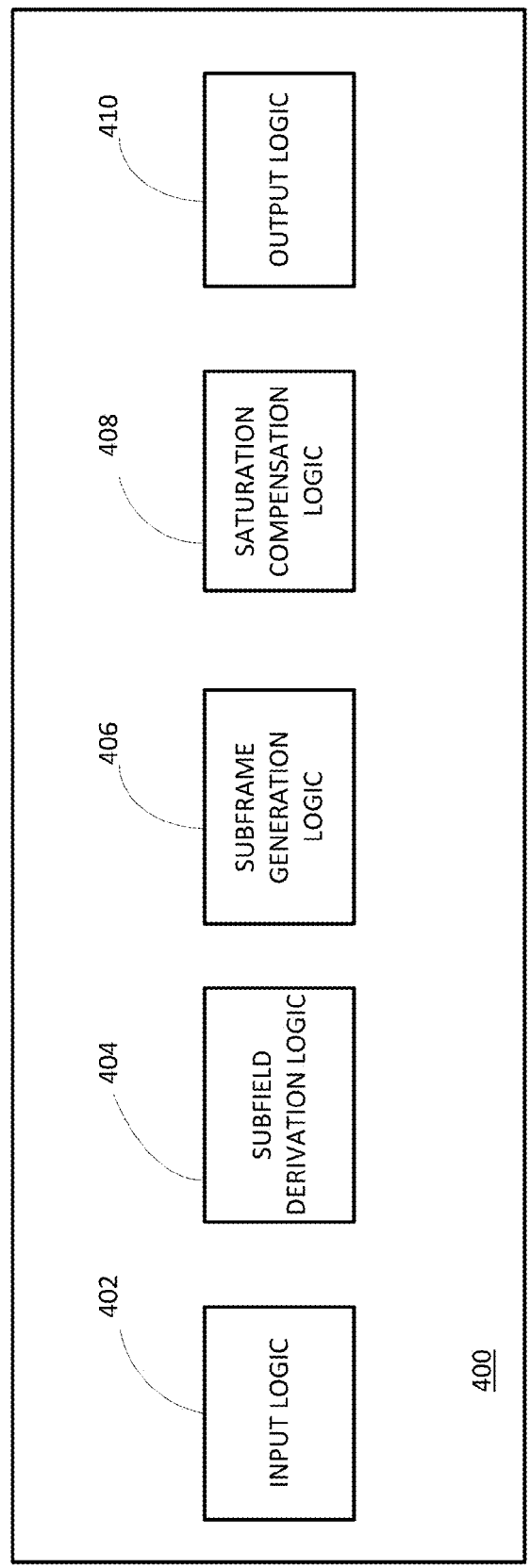
FIG. 4 shows a block diagram of example control logic suitable for use as, for example, the control logic in the display apparatus shown in FIG. 3.

FIG. 4 shows a block diagram of example control logic 400 suitable for use as, for example, the control logic 306 in the display apparatus 300 shown in FIG. 3. More particularly, FIG. 4 shows a block diagram of functional modules executed by the microprocessor 316 and the I/F Chip 318 or by other integrated circuitry logic forming or included in the control logic 400. Each functional module can be implemented as software in the form of computer executable instructions stored on a tangible computer readable medium, which can be executed by the microprocessor 316 and/or as logic circuitry incorporated into the I/F Chip 318. In some implementations, the functionality of each module described below is designed to increase the amount of the functionality that can be implemented in integrated circuit logic, such as an ASIC, in some cases substantially eliminating or eliminating altogether the need for the microprocessor 316.

The control logic 400 includes input logic 402, subfield derivation logic 404, subframe generation logic 406, saturation compensation logic 408, and output logic 410. Generally, the input logic 402 receives input images for display. The subfield derivation logic 404 converts the received image frames into color subfields. The subframe generation logic 406 converts color subfields into a series of subframes that can be directly loaded into an array of display elements, such as the display elements 310 shown in FIG. 3. The saturation compensation logic 408 evaluates the contents of a received image frame and provides image saturation-based conversion parameters to the subfield derivation logic 404 and the subframe generation logic 406 (as discussed further in relation to FIG. 8). The output logic 410 controls the loading of the generated subframes into an array of display elements, such as the display elements 310 shown in FIG. 3, and controls the illumination of a backlight, such as the backlight 314, also shown in FIG. 3, to illuminate and display the subframes. While shown as separate functional modules in FIG. 4, in some implementations, the functionality of two or more of the modules may be combined into one or more larger, more comprehensive modules, or divided into smaller, more discrete modules. Together the components of the control logic 400 function to carry out a method for generating an image on a display.

Figure 5:
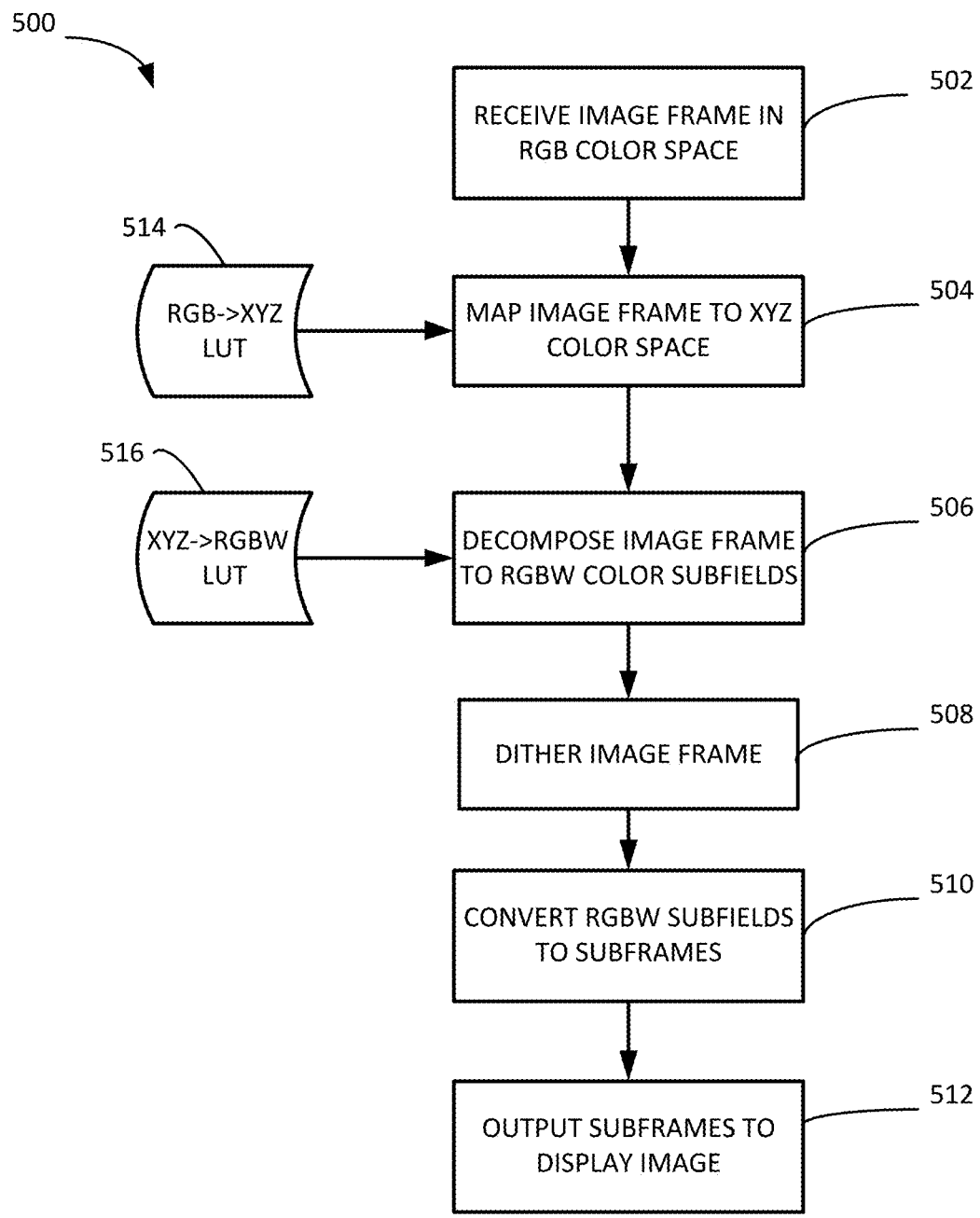
FIG. 5 shows a flow diagram of an example process for generating an image on a display using the control logic shown in FIG. 4.
Figure 8:
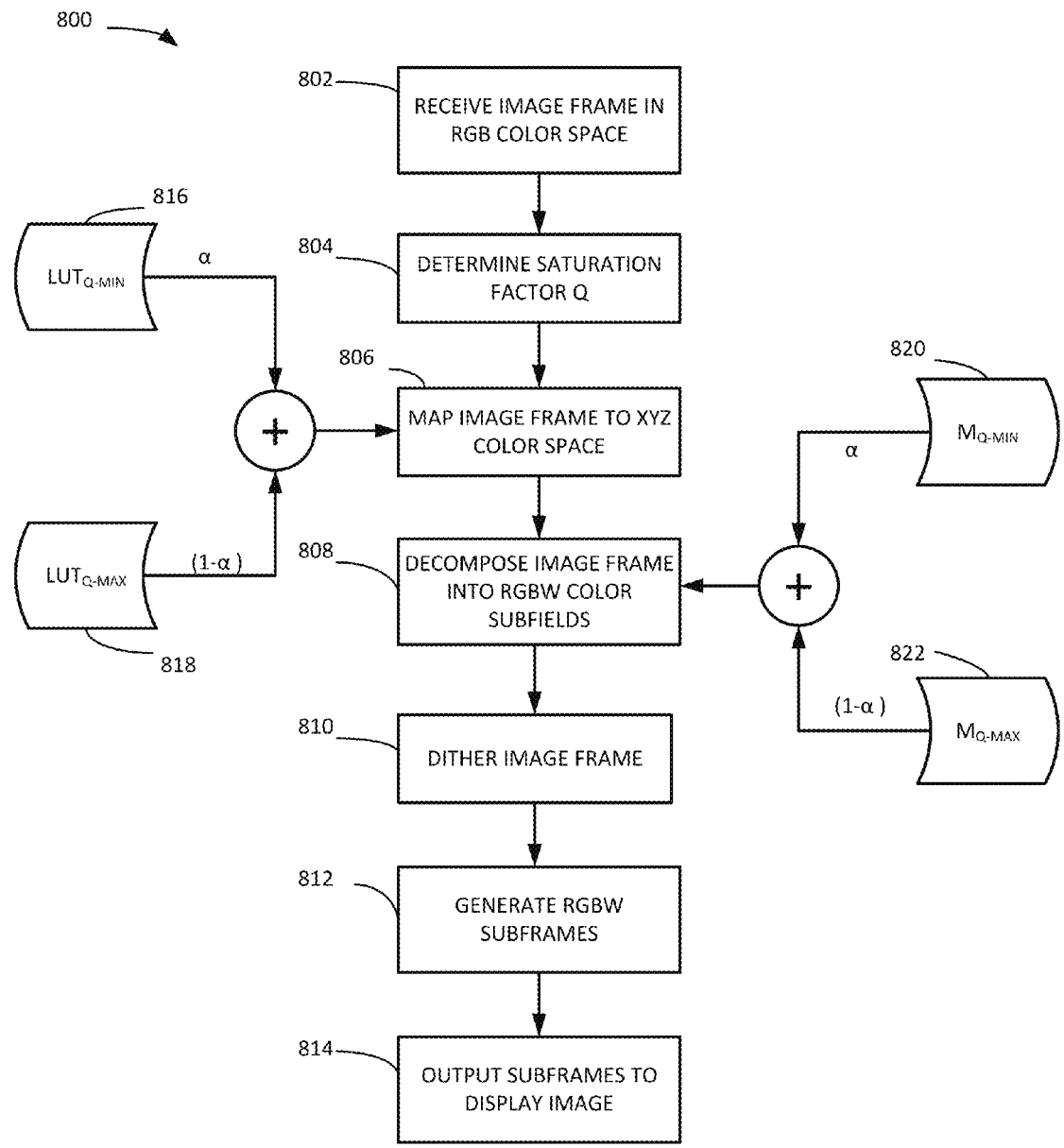
FIG. 8 shows a flow diagram of another example process for generating an image on a display using the control logic shown in FIG. 4.

FIG. 5 shows a flow diagram of an example process 500 for generating an image on a display using the control logic 400 shown in FIG. 4. The process 500 includes receiving an image frame (stage 502), mapping the received image frame to the XYZ color space (stage 504), decomposing the image frame from the XYZ color space into red (R), green (G), blue (B), and white (W) color subfields (stage 506), dithering the image frame (stage 508), generating subframes for each of the color subfields (stage 510), and displaying the subframes to output the image (stage 512). In some implementations, the process 500 displays images without the use of the saturation compensation logic 408. A process using the saturation compensation logic 408 is shown in FIG. 8.

Referring to FIGS. 4 and 5, the process 500 includes the input logic 402 receiving data associated with an image frame (stage 502). Typically, such image data is obtained as a stream of intensity values for the red, green, and blue components of each pixel in the image frame. The intensity values typically are received as binary numbers. The received data is stored as an input set of RGB color subfields. Each color subfield includes for each pixel in the display an intensity value indicating the amount of light to be transmitted by that pixel, for that color, to form the image frame. In some implementations, the input logic 402 and/or the subfield derivation logic 404 derives the input set of component color subfields by segregating the pixel intensity values for each primary color represented in the received image data (typically red, green, and blue) into respective subfields. In some implementations, one or more image pre-processing operations, such as gamma correction and dithering, also may be carried out by the input logic 402 and/or the subfield derivation logic 404 prior to, or in the process of, deriving the input set of color subfields.

The subfield derivation logic 404 converts the input set of color subfields into the XYZ color space (stage 504). To expedite the conversion process, the subfield derivation logic can employ a three-dimensional LUT, in which the intensity values of the respective input color subfields serve as the index into the LUT. Each triplet of {R,G,B} intensity values is mapped to a corresponding vector in the XYZ color space. The LUT is referred to as a RGB→XYZ LUT 514. The RGB→XYZ LUT 514 can be stored in memory incorporated into the control logic 400, or it can be stored in memory external to, but accessible by, the control logic 400. In some implementations, the subfield derivation logic 404 can separately calculate XYZ tristimulus values for each pixel using a conversion matrix matched to the color gamut used to encode the image frame.

The subfield derivation logic 404 converts the pixel values in the XYZ tristimulus color space into red (R), green (G), blue (B), and white (W) subfields (or RGBW subfields) (stage 506). The subfield derivation logic applies a decomposition matrix M, which is defined as follows:

$$M = \begin{bmatrix} X_r^{subfield} & X_g^{subfield} & X_b^{subfield} & X_w^{subfield} \\ Y_r^{subfield} & Y_g^{subfield} & Y_b^{subfield} & Y_w^{subfield} \\ Z_r^{subfield} & Z_g^{subfield} & Z_b^{subfield} & Z_w^{subfield} \end{bmatrix},$$

where $X_r^{subfield}$, $Y_r^{subfield}$, and $Z_r^{subfield}$ correspond to the XYZ tristimulus values of the color of the light used to illuminated subframes associated with the red subfield, $X_g^{subfield}$, $Y_g^{subfield}$, and $Z_g^{subfield}$ correspond to the XYZ tristimulus values of the color of the light used to illuminated subframes associated with the green subfield, $X_b^{subfield}$, $Y_b^{subfield}$, and $Z_b^{subfield}$ and correspond to the XYZ tristimulus values of the color of the light used to illuminated subframes associated with the blue subfield, and $X_w^{subfield}$, $Y_w^{subfield}$, and $Z_w^{subfield}$ correspond to the XYZ tristimulus values of the color of the light used to illuminated subframes associated with the white subfield. Each pixel value in the RGBW space is equal to:

$$\begin{bmatrix} R \\ G \\ B \\ W \end{bmatrix} = f\left\{ \begin{bmatrix} X \\ Y \\ Z \end{bmatrix}, M \right\},$$

where f is some decomposition procedure involving the decomposition matrix M and the desired tristimulus value XYZ.

In some implementations, instead of applying a decomposition matrix, the subfield derivation logic 404 utilizes a XYZ→RGBW LUT 516, which is stored by or is accessible by the subfield derivation logic 404. The XYZ→RGBW LUT 516 maps each XYZ tristimulus value triplet to a set of RGBW pixel intensity values.

In some implementations, the control logic 400 displays images using what is referred to as a multi-primary display process. A multi-primary display process utilizes more than three primary colors to form an image, and the sum of the XYZ tristimulus values of the primary colors equals the display XYZ tristimulus values of the gamut white point. This is in contrast to some other display processes that utilize more than three primary colors in which the sum of the primaries do not equal the white point. For example, in some display processes using red, green, blue, and white color subfields, the red, green, and blue color primaries sum to the display white point of the gamut, and the luminance provided through the white subfield is in addition to that combined luminance. That is if all RGBW primaries were illuminated at full strength, the total illumination would have twice the luminance of the gamut white point. As such, in some implementations, the XYZ values referred to above for each of the display primaries, red, green, blue and white, sum up to XYZ tristimulus values of the white point of the gamut being displayed.

In some implementations, the display outputs an image (stage 512) according to an image formation process which is capable of outputting fewer levels of gray scale than can be defined using the input image format. For example, an input image can be received as 24-bit color data, while the image formation process used by the display can output a number of colors associated with, without limitation, 21-bit, 18-bit color, or 12 bit color. In addition, the display may output the image (stage 512) using the same or different numbers of subframes per color subfield. As such, the pixel intensity values within the RGBW subfields are adjusted such that the values can be displayed with the respective allocated number of subframes for each subfield. Such adjustments can introduce quantization errors which can reduce image quality. The subfield derivation logic 404 executes a dithering process to mitigate such quantization errors (stage 508).

In some implementations, each RGBW subfield is dithered separately in the RGBW color space. In some other implementations, the RGBW subfields are collectively processed by a vector error diffusion-based dithering algorithm. In some implementations, the subfield derivation logic 404 implements a hybrid vector-scalar dithering process in which the RGB color subfields are collectively dithered using a vector dither process, while the W subfield is dithered according to a scalar dithering process.

Figures 6A, 6B:
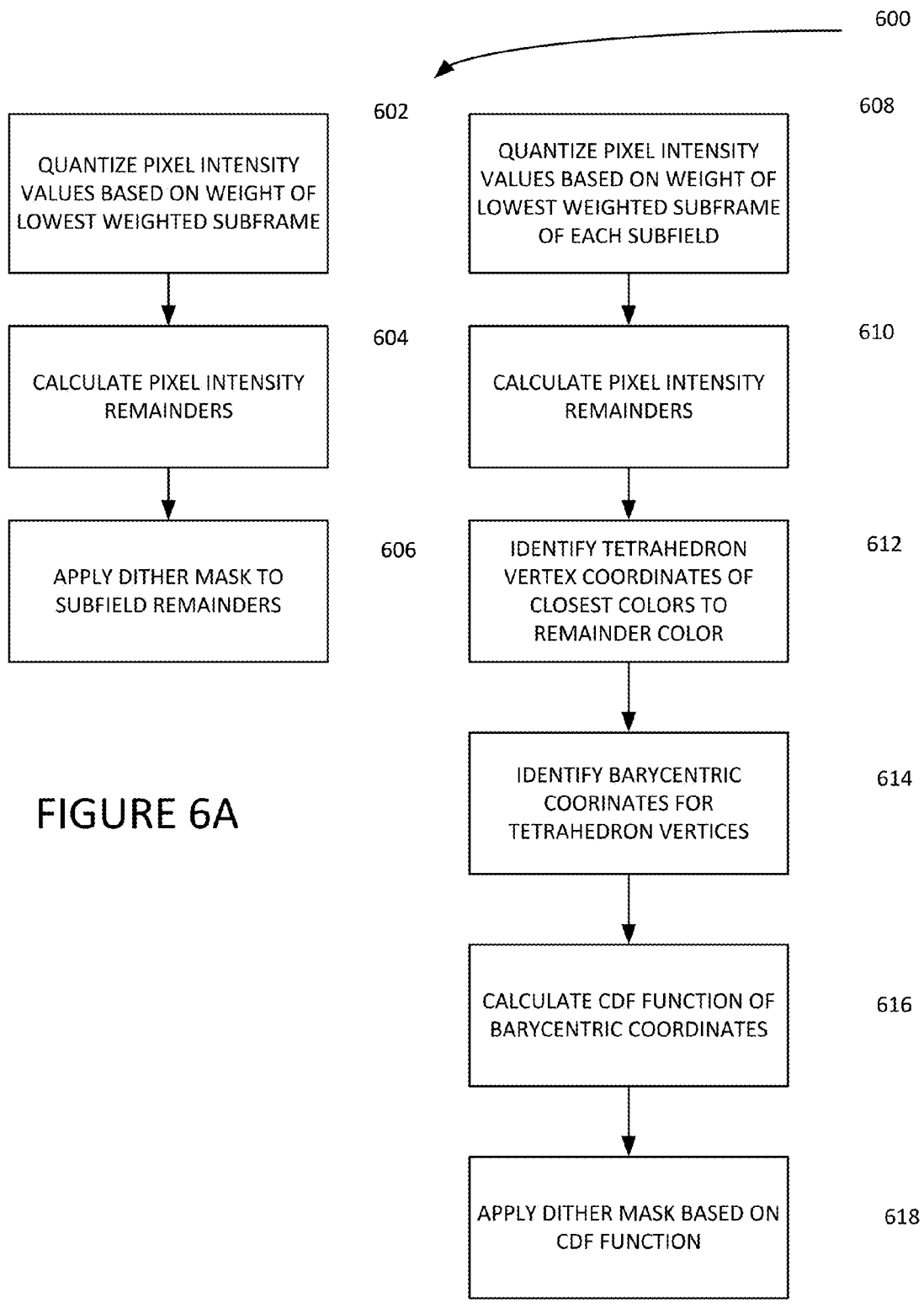
FIGS. 6A and 6B shows example flow diagrams of two portions of an example hybrid scalar-vector dithering process.

FIGS. 6A and 6B shows example flow diagrams of two portions of an example hybrid scalar-vector dithering process 600. FIG. 6A shows a flow diagram of an example process for scalar dithering a W color subfield. FIG. 6B shows a flow diagram of an example process for vector dithering a set of RGB color subfields.

Referring to FIG. 6A, the scalar dithering portion of the hybrid-vector-scalar dithering process includes quantizing pixel intensity values of the W color subfield based on the weight of a lowest weighted W subframe (stage 602), calculating pixel intensity remainders for each pixel in the W color subfield (stage 604), and applying a dither mask to the subfield remainders (stage 606).

The scalar dithering of the W subfield includes quantizing the pixel intensity values of the color subfield based on the lowest weighted subframe used to display the white color subfield. In some implementations, the control logic 400 causes images to be output using a smaller number of subframes for the W color subfield than for other color subfields. In some implementations, the W color subfield may be displayed by using between three and five subframes. For example, the W color subfield may be displayed using four subframes. Each subframe is associated with a given weight. Given the relatively smaller number of subframes used to output the W color subfield, the weight of the lowest-weighted subframe (also referred to as the "least significant bit" or "LSB") is typically greater than 1. In some implementations, each subframe is assigned a weight equal to a power of 2. In such implementations, the W LSB may have a weight equal to 8, 16, 32, or 64. In some other implementations, subframe weights are not assigned according to a binary (i.e., power of 2) weighting scheme. In such implementations, the W LSB may have a value anywhere between about 8 and about 64. Based on the weight of the W LSB ("$Weight_{LSB-W}$"), a quantized pixel intensity value, Quant{W}, is calculated for each pixel in the W color subfield by identifying the highest intensity value evenly divisible by the $Weight_{LSB-W}$.

Pixel intensity remainder values are then calculated for each pixel in the W color subfield. In some implementations, the remainders are calculated to be equal to the difference between the original pixel intensity value and the quantized pixel intensity value. In some implementations, the remainders are calculated to be fractions of the weight of the LSB by dividing the aforementioned differences by $Weight_{LSB-W}$. Calculating the remainders as fractions, or decimal numbers between 0.0 and 1.0 can facilitate comparing the remainder values to similar values in a dither mask.

A dither mask is then applied to the calculated remainder values. In some implementations, the dither mask includes an array of random values, ranging from 0.0 to 1.0, and can, though need not, have the properties of a blue noise spectrum. In some implementations, the dither mask can be about the same size as the resolution of the display. In some other implementations, the dither mask is smaller than the size of the resolution of the display, and is applied in a tiled fashion across the color subfield. For example and without limitation, the dither mask can be a 64×64, 128×128, 64×128, 128×256, or other sized pixel mask. To apply the mask, each remainder value in the W color subfield is compared to a corresponding value in the dither mask. If the remainder value is greater than (or in some implementations, greater than or equal to) the corresponding value in the dither mask, the quantized pixel intensity value for the pixel is increased by $Weight_{LSB-W}$. If the remainder value is less than (or less than or equal to) the corresponding value in the dither mask, the quantized value is left unchanged.

Referring to FIG. 6B, the vector dithering portion of the hybrid scalar-vector dithering process 600 includes, for each pixel, quantizing the pixel intensity values in each of the RGB color subfields based on the weights of the respective lowest-weighted RGB subframes (stage 608), calculating pixel intensity remainders the pixel in each subfield (stage 610), identifying the coordinates of the vertices of a tetrahedron in the RGB color cube that includes a color defined by the remainder values (stage 612), and identifying barycentric coordinates of the remainder-defined color to coordinates of the tetrahedron coordinates (stage 614). A cumulative distribution function (CDF) of the barycentric coordinates is computed (stage 616), and a dither mask value is applied based on the CDF function (stage 618).

Similar to the scalar dithering process, the vector dithering portion of the process 600 includes quantizing the pixel intensity values in the RGB color subfields (stage 608). The pixel intensity values are quantized in each subfield based upon the weight of their corresponding lowest-weighted subframes, i.e., $Weight_{LSB-R}$, $Weight_{LSB-G}$, and $Weight_{LSB-B}$. In some implementations, $Weight_{LSB-R}$, $Weight_{LSB-G}$, and $Weight_{LSB-B}$ are equal to one another. In some other implementations, one or more of $Weight_{LSB-R}$, $Weight_{LSB-G}$, and $Weight_{LSB-B}$ differ from one another. The quantized values of the pixel intensities Quant{R}, Quant{G}, and Quant{B} are equal to the highest values divisible by $Weight_{LSB-R}$, $Weight_{LSB-G}$, and $Weight_{LSB-B}$, respectively.

Remainder values are calculated for each pixel for each color subfield. As with the W color subfield, the remainder values can either be calculated as absolute remainder values or as fractions (in the form of decimal values between 0.0 and 1.0) of the weights of the LSBs of respective color subfields. The reminder values can be represented as a vector $RGB_{Remainder}$.

The vector of remainders $RGB_{Remainder}$ defines a color in the RGB color cube. The RGB color cube is a color space defined by three axes, R, G, and B, each ranging from 0.0 to 1.0. In the RGB cube color space, the color [0.0 0.0 0.0] corresponds to black (K), [1.0 0.0 0.0] corresponds to (red)R, [1.0 1.0 0.0] corresponds to yellow (Y), [1.0 1.0 1.0] corresponds to white (W), [1.0 0.0 1.0] corresponds to magenta (M), [0.0 1.0 0.0] corresponds to green (G), [0.0 1.0 1.0] corresponds to cyan (C), and [0.0 0.0 1.0] corresponds to blue (B). The RGB cube can be divided into six tetrahedrons having vertices with the smallest possible luminance variance; these are CMYW, MYGC, RGMY, KRGB, RGBM, and CMGB. For a color in any of these tetrahedrons, the barycentric coordinates of the color are the proportions of the four colors of the appropriate tetrahedron required to make the desired color.

For each pixel, the process 600 includes identifying the vertices, $V=[v_1\ v_2\ v_3\ v_4]^T$, of the tetrahedron of the RGB cube that encloses the color defined by the calculated color subfield remainders (stage 612). The process 600 further includes determining an associated inverse matrix $T^{-1}$, and thence the barycentric coordinates $w=[w_1\ w_2\ w_3\ w_4]^T$ that relate the tetrahedron's vertices to the color defined by the remainders such that:

$$[w_1 w_2 w_3] = T^{-1} \cdot (RGB_{remainder} - v_4)$$

$$w_4 = 1 - \Sigma w_{1,2,3}$$

The tetrahedron enclosing the remainder defined color can be determined according to the following logic and FIG. 7 shows the T and V matrices for each of the six tetrahedrons of the RGB cube:

```
Let RGB_remainder = [r g b]
if r + g > 1 then
    if g+b > 1 then
        if r+g+b > 2 then
            tetrahedron = CMYW tetrahedron
        else
            tetrahedron = MYGC tetrahedron
        end
    else
        tetrahedron = RGMY tetrahedron
    end
else
    if g+b < 1 then
        if r+g+b < 1 then
            tetrahedron = KRGB tetrahedron
        else
            tetrahedron = RGBM tetrahedron
        end
    else
        tetrahedron = CMGB tetrahedron
    end
end
```

A cumulative distribution function (CDF) of the tetrahedron defining the barycentric coordinates w is computed (stage 616). The cumulative density function associated with the tetrahedron vertices is:

$$CDF(k) = \Sigma_1^k w_i$$

Where k is an index value associated the vertices of the tetrahedrons. For example, for any tetrahedron, $CDF(1)=w_1$, $CDF(2)=w_1+w_2$, and so forth.

A dither mask is applied based on the CDF function (stage 618). In some implementations, the dither mask applied at this stage is identical to that applied in the dithering of the W color subfield. In some implementations, the dither mask applied at stage 618 has the same general structure as the dither mask applied to the W color subfield, but includes different values. More particularly, the subfield derivation logic identifies for a pixel, the index value k at which the CDF(k) exceeds the dither mask value corresponding to that pixel. As indicated above, k corresponds to a vertex $v_1$, $v_2$, $v_3$, or $v_4$ of the tetrahedron enclosing the remainder-defined color. That vertex then identifies which values, if any, in the color subfields are to be incremented based on the dithering. For example, if the remainder-defined color is found to be in the RGMY tetrahedron, and it is found that the CDF(k) for the pixel exceeds the dither mask value at k=3, i.e., the magenta vertex of the tetrahedron ([1, 0, 1] in the RGB cube), then the intensity values in the R and B subfields are incremented by the value of the weights of those color subfields' corresponding LSBs, $Weight_{LSB-R}$ and $Weight_{LSB-B}$. Similarly, if the vertex identified by applying the dither mask corresponds to yellow ([1, 1, 0] in the RGB cube), then the intensity values in the R and G subfields for the pixel are incremented by the weights of those color subfields' corresponding LSBs, $Weight_{LSB-R}$ and $Weight_{LSB-G}$. If the tetrahedron identified for the remainder-defined color included black ([0, 0, 0] in the RGB cube) as one of the vertices, and that vertex was selected by applying the CDF function, then the intensity values in all three RGB color subfields for the pixel would remain unchanged. As the color subfields that may be identified as having values to be incremented may have different weights for their LSBs, the above dithering process can be viewed as a multi-level dithering process. That is, the vector dithering process can simultaneously operate at multiple weighting levels.

FIG. 6C shows an example dither mask 650 suitable for use in both the scalar and vector portions of the hybrid-vector dithering process. FIG. 6C shows both a numerical representation and a graphical representation of the dither mask 650. A dither mask generally includes an array of random numbers, typically ranging from 0.0 to 1.0, though the values could fall within other ranges given suitable adjustments to the corresponding dither algorithm. The numerical representation of the dither mask 650 shows the actual numbers in the various locations of the array, whereas the graphical representation represents each value as a gray scale value ranging from white to black. The dither mask 650 is a 12×12 array, which can be tiled across an image frame. In some other implementations, a dither mask may have a different number of values and may not have an equal number of rows and columns. For example, an alternative suitable dither mask may have an aspect ratio that matches that of the image frame, 3×4 or 9×16, or other suitable aspect ratio. Further, while the numerical representation of the dither mask includes values to only two significant digits, dither masks may include values of any suitable number of significant digits, and may be represented using any numbering system, including, decimal, binary, or hex.

Referring back to FIGS. 4 and 5, the subframe generation logic 406 processes the RGBW subfields to generate sets of subframes (stage 510). Each subframe corresponds to a particular time slot in a time division gray scale image output sequence. It includes a desired state of each display element in the display for that time slot. In each time slot, a display element can take either a non-transmissive state or one or more states that allow for varying degrees of light transmission. In some implementations, the generated subframes include a distinct state value for each display element in the array of display elements 310 shown in FIG. 3.

In some implementations, the subframe generation logic 406 uses a code word LUT to generate the subframes (stage 510). In some implementations, the code word LUT stores a series of binary values referred to as code words that indicate corresponding series of display element states that result in given pixel intensity values. The value of each digit in the code word indicates a display element state (for example, light or dark, or open or close) and the position of the digit in the code word represents the weight that is to be attributed to the state. In some implementations, the weights are assigned to each digit in the code word such that each digit is assigned a weight that is twice the weight of a preceding digit. In some other implementations, multiple digits of a code word may be assigned the same weight. In some other implementations, each digit is assigned a different weight, but the weights may not all increase according to a fixed pattern, digit to digit.

To generate a set of subframes (stage 510), the subframe generation logic 406 obtains code words for all pixels in a color subfield. The subframe generation logic 406 can aggregate the digits in each of the respective positions in the code words for the set of pixels in the subfield together into subframes. For example, the digits in the first position of each code word for each pixel are aggregated into a first subframe. The digits in the second position of each code word for each pixel are aggregated into a second subframe, and so forth. The subframes, once generated, are stored in the frame buffer 308 shown in FIG. 3.

In some other implementations, for example in implementations using light modulators capable of achieving one or more partially transmissive states, the code word LUT may store code words using base-3, base-4, base-10, or some other base number scheme.

The output logic 410 of the control logic 400 (shown in FIG. 4) can output the generated subframes to display the received image frame (stage 512). Similar to as described above in relation to FIG. 3 with respect to the I/F chip 318, the output logic 410 causes each subframe to be loaded into the array of display elements 310 (shown in FIG. 3) and to be illuminated according to an output sequence. In some implementations, the output sequence is capable of being configured, and may be modified based on user preferences, the content of image data being displayed, external environmental factors, etc.

By displaying some amount of image luminance through a white subfield, which can be illuminated by a higher efficiency white light source, such as white LEDs (which tend to be more power efficient than red, green, or blue LEDs), the process 500 can improve the energy efficiency of a display. Given that the process 500 uses a single set of tristimulus values for each of the subfields being display, the process is computationally efficient, but image quality may be reduced when reproducing certain images. In some implementations, energy efficiency also may suffer. For example, assuming a non-negligible portion of image luminance is pushed to the white subfield, images with highly saturated colors may appear washed out.

FIG. 8 shows a flow diagram of another example process 800 for generating an image on a display using the control logic 400 shown in FIG. 4. The process 800 utilizes the saturation compensation logic 408 to mitigate image quality issues that can arise with the display process 500 depicted in FIG. 5. More particularly, the process 800 adjusts the manner in which input pixel values are converted to the XYZ color space and the manner in which pixel values in the XYZ color space are converted into pixel values in RGBW subfields based on a saturation metric, Q, which can be determined, in some implementations, for each image frame. In some implementations, such as for video images, a single Q value can be determined based on a first image frame in a scene and can be used for subsequent image frames until a scene change is detected. The process 800 includes receiving an image frame in the RGB color space (stage 802), determining a saturation factor, Q, for the image frame (stage 804), mapping the pixel values in the image frame to the XYZ color space based on Q (stage 806), decomposing the image frame in the XYZ color space into RGBW subfields (stage 808), dithering the image frame (stage 810), generating RGBW subframes (stage 812) and outputting the subframes to display the image (stage 814).

The process 800 includes receiving an image frame in the RGB color space (stage 802) in the form of a stream of RGB pixel values as described above in relation to stage 502 shown in FIG. 5. As described with respect to stage 502, stage 802 can include pre-processing the pixel values and storing the results in a set of input RGB color subfields.

The saturation compensation logic 408 shown in FIG. 4 processes the image frame to determine a saturation factor Q for the image frame (stage 804). The Q parameter corresponds to the relative size of the output color gamut to the input color gamut. Viewed another way, Q represents the degree to which an image's luminance will be output by the display through the white subfield, relative to the red, green, and blue subfields. In general, as the Q value increases, the size of the color gamut output by the display shrinks. The shrinkage can be the result of the intensities of the subfield colors being reduced while their chromaticities remain fixed. For example, a Q value of 1.0 corresponds to a black and white image, as all display luminance is output in the white subfield. A Q value of 0.0 corresponds to a fully saturated color gamut formed purely by red, green, and blue color fields, without any luminance being transferred to a white subfield. Images including highly saturated colors can be more faithfully represented with low values of Q, whereas as images with large amounts of white content (for example, word processing documents and many web pages) can be displayed with higher values of Q without a perceptually significant decrease in quality, and while obtaining significant power savings. Accordingly Q is selected to be large for images that include largely unsaturated colors, whereas low Q values are selected for images that include highly saturated colors. In some implementations, the Q value can be obtained by taking histogram data associated with the input pixel values and using some or all of the histogram data as an index into a Q value LUT. In some implementations, the set of input RGB color subfields are analyzed to determine the maximum white intensity value that can be extracted from all pixels in the image frame without introducing color error. In some such implementations, Q is calculated as follows:

$$Q = \frac{\text{Min}_{all\ pixels}(\text{Min}_{pixel}(R, G, B))}{\text{MaxIntensity}},$$

where MaxIntensity corresponds to the maximum intensity value possible in a subfield (such as 255 in an 8-bit subfield).

In some other implementations, Q can be calculated in the XYZ color space. In such implementations, $Q_s$ can be determined by identifying the size of a minimum bounding hexagon which can enclose all XYZ pixel values included in input image projected to a common plane normal to an XYZ color space central axis connecting the XYZ values of black (at the origin) and pure white (such as XYZ values of 0.9502, 1.0, 1.0884). Q can be set equal to the difference between 1.0 and the ratio of the size of the bounding hexagon and the hexagon that would result from capturing the full display color gamut (such as the sRGB, Adobe RGB color gamut, or the rec.2020 color gamut).

Based on the determined Q value, the pixel values stored in the input set of RGB color subfields are mapped to the XYZ color space (stage 806). As indicated above, as more image luminance is output through a white subfield as Q increases, rather than through the red, green, and blue subfields, the gamut of the output image is decreased. To maintain image quality, i.e., to maintain an appropriate color balance given the selected saturation level, pixel values are converted to the XYZ color space using gamut mapping algorithms tailored to the reduced output gamuts.

In some implementations, RGB values can be converted to the XYZ color space by multiplying a set of RGB pixel values by a Q-dependent color transform matrix. In some other implementations, to increase the speed of the conversion, three-dimensional Q-dependent RGB→XYZ LUTs can be stored by (or may be accessible by) the saturation compensation logic 408, indexed by {R,G,B} triplet values. Storing a large number of such LUTs, may, for some implementations, become prohibitive from a memory capacity standpoint. To ameliorate the memory capacity concerns associated with storing a large number of Q-dependent RGB→XYZ LUTs, the saturation compensation logic 408 may store a relatively small number of Q-dependent RGB→XYZ LUTs, and use interpolation between the LUTs for Q values other than those associated with the stored LUTs.

FIG. 8 shows one such example implementation. The process 800 shown in FIG. 8 utilizes two Q-dependent RGB→XYZ LUTs, i.e., a $Q_{min}$ LUT 816 and a $Q_{max}$ LUT 818. The $Q_{min}$ LUT 816 is a RGB→XYZ LUTs based on the lowest value of Q used by the control logic 400. The $Q_{max}$ LUT 818 is a RGB→XYZ LUTs based on the highest value of Q used by the control logic 400. In some implementations, the minimum Q value ranges from about 0.01 to about 0.2, and the maximum Q value ranges from about 0.4 to about 0.8. In some implementations, the maximum Q value can range up to 1.0. In some implementations, more than two Q-dependent RGB→XYZ LUTs can be employed for more accurate interpolation. For example, in some implementations, the process 800 can use RGB→XYZ LUTs for Q values of 0.0, 0.5, and 1.0.

To carry out the interpolation, the saturation compensation logic 408 can calculate a scaling factor α, as follows:

$$\alpha = \frac{Q_{MAX} - Q}{Q_{MAX} - Q_{MIN}}$$

As the XYZ color space is linear, the XYZ tristimulus values for any RGB input pixel value with any Q values between $Q_{min}$ and $Q_{max}$ can be calculated to be equal to:

$$\alpha LUT_{Q\text{-}min}(RGB) + (1-\alpha)LUT_{Q\text{-}max}(RGB),$$

where LUT(RGB) represents the output of an LUT for a given RGB input pixel value. In some implementations, instead of carrying out two lookup functions for each pixel value, the saturation compensation logic 408 generates a new RGB→XYZ LUTs for each image frame (or each time Q changes between image frames), combining the $Q_{min}$ LUT and a Q. LUT according to a similar equation for determining the XYZ tristimulus values for a given RGB input pixel value. That is:

$$LUT_Q = \alpha LUT_{Q\text{-}min} + (1-\alpha)LUT_{Qmax}.$$

Once the image pixel values are in the XYZ tristimulus space, the subfield derivation logic 404 decomposes the pixel values into a set of RGBW color subfields (stage 808). Similar to the pixel decomposition stage (stage 506) shown in FIG. 5, in stage 808, the subfield derivation logic 404 decomposes each pixel value using a decomposition matrix. In stage 808, however, the subfield derivation logic 404 uses a Q-dependent decomposition matrix $M_Q$. The Q-dependent decomposition matrix, $M_Q$, has the same form as the decomposition matrix M, other than the XYZ values associated with each subfield vary based on the value of Q selected.

In some implementations, the saturation compensation logic 408 stores, or has access to, a set of decomposition matrices for a large range of Q values. In some other implementations, to save memory, as with the RGB→XYZ LUTs, the control logic 400 can store or access a more limited set of decomposition matrices, $M_Q$, with matrices for other values being calculated via interpolation. For example, the control logic may store or access a first decomposition matrix, $M_{Q\text{-}min}$ 620 and a second decomposition matrix, $M_{Q\text{-}max}$ 622. Decomposition matrices for values of Q between $Q_{min}$ and $Q_{max}$ can be calculated as follows:

$$M_Q = \alpha M_{Q\text{-}min} + (1-\alpha)M_{Q\text{-}max}.$$

In some other implementations, instead of using a Q-dependent decomposition matrix in stage 808, the subfield derivation logic 404 instead utilizes a Q-dependent XYZ-→RGBW LUT. As with the Q-dependent RGB→XYZ LUTs, the subfield derivation logic 404 can store or have access to a limited number of Q-dependent XYZ→RGBW LUTs. The subfield derivation logic 404 can then generate a frame-specific XYZ→RGBW LUT for the image frame based on its corresponding Q value through a similar interpolation process used to generate a Q-specific RGB→XYZ LUT.

In some other implementations, a LUT may not be used at all, and the XYZ to RGBW decomposition is derived directly first multiplying the XYZ pixel values by a matrix M' to obtain virtual primaries R' G' B' that enclose the display gamut for all Q. This matrix M' corresponds to $M_{Q=0}$, since the gamut for Q=0 encloses the gamut obtained for all Q>0. Intensity values for R, G, B and W are then obtained by calculating:

$$W = \min\left\{\min\left\{\frac{1-Q}{Q}(R', G', B')\right\}, 1\right\}, \text{ and}$$

$$R, G, B = R', G', B' - \frac{Q}{1-Q}W.$$

In some implementations, image artifacts, specifically dynamic false contouring (DFC), can be reduced by transferring additional light energy back from the W channel to the RGB channels. In some implementations, this transfer is done to maximum extent possible without reducing color fidelity. To calculate this transfer amount, in some implementations, a vector W is calculated according to the following equation:

$$W = \frac{1-Q}{Q} \min\{m_{R,G,B} - (R, G, B)\},$$

where $m_{R,G,B}$ is a vector of the maximum possible values (in decimal format between 0.0 and 1.0) of each of the color subfields given the number of subframes used to display the color subfield and their corresponding weights. $m_{R,G,B}$ can be calculated by subtracting the weight (in decimal format) of the corresponding LSBs from 1.0. For example, the R component of $m_{R,G,B}$ is equal to 1−Weight$_{LSB-R}$, the G component is equal to 1−Weight$_{LSB-G}$, and the B component is equal to 1−Weight$_{LSB-B}$. A second vector dW is then calculated as follows:

$$dW = \min\{W, m_w\},$$

where $m_w$ corresponds to the maximum possible value of the W channel, calculated as 1−Weight$_{LSB-W}$. The second vector, dW is then scaled by a factor of $$\frac{Q}{1-Q}.$$

The values of the components of the scaled vector are added to the corresponding pixel intensity values in the appropriate color subfields. The pixel intensity value in the white subfield is then reduced accordingly.

The display process 800 includes dithering the results of the pixel decomposition stage (stage 810) and generating a set of RGBW subframes from the results of the dithering (stage 812). The dithering stage (stage 810) and the subframe generation stage (stage 812) can be identical to the corresponding processing stages (stages 508 and 510) in the process 500 discussed in relation to FIG. 5. For example, the dither process at stage 810 can be the hybrid scalar-vector dithering process 600 shown in FIGS. 6A and 6B.

The generated RGBW subframes are output to display an image (stage 814). In contrast to the output stage 512 shown in FIG. 5, the subframe output stage (stage 814) includes a light source intensity calculation process to adjust the intensities of the light sources based on the value of Q selected for the image frame. As indicated above, the selection of Q results in a modification to the display gamut, as such the light source intensities for each of the RGB subfields are adjusted to be less saturated as Q increases and the intensity of the white light source for the white subfield is increased as Q increases. In some implementations, the light source intensities are scaled linearly based on the value of Q. For example, with a Q of 0.5, the light source intensity values for each non-white subfield are multiplied by 0.5. If Q were 0.2, the light source intensity values for each non-white subfield would be multiplied by 0.8, and so forth. In some implementations, the light source intensity calculation can be carried out earlier in the process 800.

FIGS. 9A and 9B show system block diagrams of an example display device 40 that includes a plurality of display elements. The display device 40 can be, for example, a smart phone, a cellular or mobile telephone. However, the same components of the display device 40 or slight variations thereof are also illustrative of various types of display devices such as televisions, computers, tablets, e-readers, hand-held devices and portable media devices.

The display device 40 includes a housing 41, a display 30, an antenna 43, a speaker 45, an input device 48 and a microphone 46. The housing 41 can be formed from any of a variety of manufacturing processes, including injection molding, and vacuum forming. In addition, the housing 41 may be made from any of a variety of materials, including, but not limited to: plastic, metal, glass, rubber and ceramic, or a combination thereof. The housing 41 can include removable portions (not shown) that may be interchanged with other removable portions of different color, or containing different logos, pictures, or symbols.

The display 30 may be any of a variety of displays, including a bi-stable or analog display, as described herein. The display 30 also can be capable of including a flat-panel display, such as plasma, electroluminescent (EL) displays, OLED, super twisted nematic (STN) display, LCD, or thin-film transistor (TFT) LCD, or a non-flat-panel display, such as a cathode ray tube (CRT) or other tube device. In addition, the display 30 can include a mechanical light modulator-based display, as described herein.

The components of the display device 40 are schematically illustrated in FIG. 9B. The display device 40 includes a housing 41 and can include additional components at least partially enclosed therein. For example, the display device 40 includes a network interface 27 that includes an antenna 43 which can be coupled to a transceiver 47. The network interface 27 may be a source for image data that could be displayed on the display device 40. Accordingly, the network interface 27 is one example of an image source module, but the processor 21 and the input device 48 also may serve as an image source module. The transceiver 47 is connected to a processor 21, which is connected to conditioning hardware 52. The conditioning hardware 52 may be configured to condition a signal (such as filter or otherwise manipulate a signal). The conditioning hardware 52 can be connected to a speaker 45 and a microphone 46. The processor 21 also can be connected to an input device 48 and a driver controller 29. The driver controller 29 can be coupled to a frame buffer 28, and to an array driver 22, which in turn can be coupled to a display array 30. One or more elements in the display device 40, including elements not specifically depicted in FIG. 9A, can be capable of functioning as a memory device and be capable of communicating with the processor 21. In some implementations, a power supply 50 can provide power to substantially all components in the particular display device 40 design.

The network interface 27 includes the antenna 43 and the transceiver 47 so that the display device 40 can communicate with one or more devices over a network. The network interface 27 also may have some processing capabilities to relieve, for example, data processing requirements of the processor 21. The antenna 43 can transmit and receive signals. In some implementations, the antenna 43 transmits and receives RF signals according to any of the IEEE 16.11 standards, or any of the IEEE 802.11 standards. In some other implementations, the antenna 43 transmits and receives RF signals according to the Bluetooth® standard. In the case of a cellular telephone, the antenna 43 can be designed to receive code division multiple access (CDMA), frequency division multiple access (FDMA), time division multiple access (TDMA), Global System for Mobile communications (GSM), GSM/General Packet Radio Service (GPRS), Enhanced Data GSM Environment (EDGE), Terrestrial Trunked Radio (TETRA), Wideband-CDMA (W-CDMA), Evolution Data Optimized (EV-DO), 1×EV- DO, EV-DO Rev A, EV-DO Rev B, High Speed Packet Access (HSPA), High Speed Downlink Packet Access (HSDPA), High Speed Uplink Packet Access (HSUPA), Evolved High Speed Packet Access (HSPA+), Long Term Evolution (LTE), AMPS, or other known signals that are used to communicate within a wireless network, such as a system utilizing 3G, 4G or 5G, or further implementations thereof, technology. The transceiver 47 can pre-process the signals received from the antenna 43 so that they may be received by and further manipulated by the processor 21. The transceiver 47 also can process signals received from the processor 21 so that they may be transmitted from the display device 40 via the antenna 43.

In some implementations, the transceiver 47 can be replaced by a receiver. In addition, in some implementations, the network interface 27 can be replaced by an image source, which can store or generate image data to be sent to the processor 21. The processor 21 can control the overall operation of the display device 40. The processor 21 receives data, such as compressed image data from the network interface 27 or an image source, and processes the data into raw image data or into a format that can be readily processed into raw image data. The processor 21 can send the processed data to the driver controller 29 or to the frame buffer 28 for storage. Raw data typically refers to the information that identifies the image characteristics at each location within an image. For example, such image characteristics can include color, saturation and gray-scale level.

The processor 21 can include a microcontroller, CPU, or logic unit to control operation of the display device 40. The conditioning hardware 52 may include amplifiers and filters for transmitting signals to the speaker 45, and for receiving signals from the microphone 46. The conditioning hardware 52 may be discrete components within the display device 40, or may be incorporated within the processor 21 or other components.

The driver controller 29 can take the raw image data generated by the processor 21 either directly from the processor 21 or from the frame buffer 28 and can re-format the raw image data appropriately for high speed transmission to the array driver 22. In some implementations, the driver controller 29 can re-format the raw image data into a data flow having a raster-like format, such that it has a time order suitable for scanning across the display array 30. Then the driver controller 29 sends the formatted information to the array driver 22. Although a driver controller 29 is often associated with the system processor 21 as a stand-alone Integrated Circuit (IC), such controllers may be implemented in many ways. For example, controllers may be embedded in the processor 21 as hardware, embedded in the processor 21 as software, or fully integrated in hardware with the array driver 22.

The array driver 22 can receive the formatted information from the driver controller 29 and can re-format the video data into a parallel set of waveforms that are applied many times per second to the hundreds, and sometimes thousands (or more), of leads coming from the display's x-y matrix of display elements. In some implementations, the array driver 22 and the display array 30 are a part of a display module. In some implementations, the driver controller 29, the array driver 22, and the display array 30 are a part of the display module.

In some implementations, the driver controller 29, the array driver 22, and the display array 30 are appropriate for any of the types of displays described herein. For example, the driver controller 29 can be a conventional display controller or a bi-stable display controller (such as a mechanical light modulator display element controller). Additionally, the array driver 22 can be a conventional driver or a bi-stable display driver (such as a mechanical light modulator display element controller). Moreover, the display array 30 can be a conventional display array or a bi-stable display array (such as a display including an array of mechanical light modulator display elements). In some implementations, the driver controller 29 can be integrated with the array driver 22. Such an implementation can be useful in highly integrated systems, for example, mobile phones, portable-electronic devices, watches or small-area displays.

In some implementations, the input device 48 can be configured to allow, for example, a user to control the operation of the display device 40. The input device 48 can include a keypad, such as a QWERTY keyboard or a telephone keypad, a button, a switch, a rocker, a touch-sensitive screen, a touch-sensitive screen integrated with the display array 30, or a pressure- or heat-sensitive membrane. The microphone 46 can be configured as an input device for the display device 40. In some implementations, voice commands through the microphone 46 can be used for controlling operations of the display device 40. Additionally, in some implementations, voice commands can be used for controlling display parameters and settings.

The power supply 50 can include a variety of energy storage devices. For example, the power supply 50 can be a rechargeable battery, such as a nickel-cadmium battery or a lithium-ion battery. In implementations using a rechargeable battery, the rechargeable battery may be chargeable using power coming from, for example, a wall socket or a photovoltaic device or array. Alternatively, the rechargeable battery can be wirelessly chargeable. The power supply 50 also can be a renewable energy source, a capacitor, or a solar cell, including a plastic solar cell or solar-cell paint. The power supply 50 also can be configured to receive power from a wall outlet.

In some implementations, control programmability resides in the driver controller 29 which can be located in several places in the electronic display system. In some other implementations, control programmability resides in the array driver 22. The above-described optimization may be implemented in any number of hardware and/or software components and in various configurations.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, e.g., a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also can be implemented as one or more computer programs, i.e., one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of any device as implemented.

Certain features that are described in this specification in the context of separate implementations also can be implemented in combination in a single implementation. Conversely, various features that are described in the context of a single implementation also can be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted can be incorporated in the example processes that are schematically illustrated. For example, one or more additional operations can be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. Additionally, other implementations are within the scope of the following claims. In some cases, the actions recited in the claims can be performed in a different order and still achieve desirable results.

What is claimed is:

1. An apparatus, comprising
a display that includes an array of display elements;
a processor capable of communicating with the display, the processor being capable of processing image data;
a memory device capable of communicating with the processor; and
a controller configured to:
receive an input image frame;
generate a first set of color subfields based on the received input image frame;
process the first set of color subfields to obtain a second set of color subfields, the second set of color subfields including a larger number of color subfields than the first set of color subfields;
execute a scalar dithering process on at least one color subfield of the second set of color subfields using a first dither mask;
execute a vector dithering process across at least two color subfields of the second set of color subfields using a second dither mask; and
cause the dithered second set of color subfields to be output on a display.

2. The apparatus of claim 1, wherein the first dither mask is identical to the second dither mask.

3. The apparatus of claim 1, wherein the at least one color subfield to which the scalar dithering is applied corresponds to a composite color.

4. The apparatus of claim 3, wherein the composite color is white.

5. The apparatus of claim 1, wherein the at least two color subfields across which the vector dithering process is applied each correspond to component colors.

6. The apparatus of claim 1, wherein the second set of color subfields includes a red color subfield, a green color subfield, a blue color subfield, and a white color subfield, wherein the scalar dithering process is applied to the white color subfield, and the vectoring dithering process is applied across the red, green, and blue color subfields.

7. The apparatus of claim 1, wherein generating the second set of color subfields includes quantizing interim pixel intensity values for each color subfield based on a number of subframes to be used to display the respective color subfields.

8. The apparatus of claim 7, wherein the controller is configured to obtain the interim pixel intensity values by applying a gamut mapping process to the first set of color subfields.

9. The apparatus of claim 8, wherein generating the second set of color subfields includes calculating remainder values for each of the pixels in the subfields based upon the quantizing of the interim pixel values, and wherein executing the vector dithering process and the scalar dithering process both include processing the remainder values.

10. The apparatus of claim 9, wherein executing the vector dithering process further includes determining barycentric coordinates of a color defined by the remainders of the color subfields across which the vector dithering process is applied with respect to respective vertices of a tetrahedron within the RGB color cube that encloses the remainder-defined color and comparing values of a cumulative distribution function of the barycentric coordinates to a corresponding value in a dither mask.

11. The apparatus of claim 1, wherein the controller is configured to output at least two of the color subfields across which the vector dithering process is applied with different numbers of subframes.

12. The apparatus of claim 11, wherein the vector dithering process is a multi-level dithering process.

13. The apparatus of claim 1, wherein the controller is further configured to determine a saturation factor for the received image frame and wherein processing the first set of color subfields to obtain the second set of color subfields includes processing the first color subfields based at least in part on the determined saturation factor.

14. The apparatus of claim 1, the display further including:
a driver circuit capable of sending at least one signal to the display; and
a second controller capable of sending at least a portion of the image data to the driver circuit.

15. The apparatus of claim 1, further including:
an image source module capable of sending the image data to the processor, wherein the image source module includes at least one of a receiver, transceiver, and transmitter; and
an input device capable of receiving input data and to communicate the input data to the processor.

16. An method for displaying an image, comprising:
receiving an input image frame;
generating a first set of color subfields based on the received input image frame;
processing the first set of color subfields to obtain a second set of color subfields, the second set of color subfields including a larger number of color subfields than the first set of color subfields;
executing a scalar dithering process on at least one color subfield of the second set of color subfields using a first dither mask;
executing a vector dithering process across at least two color subfields of the second set of color subfields using a second dither mask; and
causing the dithered second set of color subfields to be output on a display including an array of display elements, wherein the display further comprises:
a processor capable of communicating with the display, the processor being capable of processing image data, and
a memory device capable of communicating with the processor.

17. The method of claim 16, wherein the first dither mask is identical to the second dither mask.

18. The method of claim 16, wherein the at least one color subfield to which the scalar dithering is applied corresponds to a composite color, and each of the at least two colors across which the vector dithering process is applied correspond to component colors.

19. The method of claim 16, wherein the second set of color subfields includes a red color subfield, a green color subfield, a blue color subfield, and a white color subfield, wherein the scalar dithering process is applied to the white color subfield, and the vectoring dithering process is applied across the red, green, and blue color subfields.

20. The method of claim 16, wherein generating the second set of color subfields includes quantizing interim pixel intensity values for each color subfield based on a number of subframes to be used to display the respective color subfields.

21. The method of claim 20, further comprising obtaining the interim pixel intensity values by applying a gamut mapping process to the first set of color subfields.

22. The method of claim 21, wherein generating the second set of color subfields includes calculating remainder values for each of the pixels in the subfields based upon the quantizing of the interim pixel values, and wherein executing the vector dithering process and the scalar dithering process both include processing the remainder values.

23. The method of claim 16, wherein the at least two of the color subfields across which the vector dithering process is applied are output with different numbers of subframes.

24. The method of claim 16, further comprising determining a saturation factor for the received image frame and wherein, processing the first set of color subfields to obtain the second set of color subfields includes processing the first color subfields based at least in part on the determined saturation factor.

25. A computer readable medium storing instructions, which when executed by a processor, cause the processor to carry out a method, comprising:
receiving an input image frame;
generating a first set of color subfields based on the received input image frame;
processing the first set of color subfields to obtain a second set of color subfields, the second set of color subfields including a larger number of color subfields than the first set of color subfields;
executing a scalar dithering process on at least one color subfield of the second set of color subfields using a first dither mask;
executing a vector dithering process across at least two color subfields of the second set of color subfields using a second dither mask; and
causing the dithered second set of color subfields to be output on a display including an array of display elements, wherein the processor is capable of communicating with the display and processing image data, and wherein the display further comprises a memory device capable of communicating with the processor.

26. The computer readable medium of claim 25, wherein the first dither mask is identical to the second dither mask.

27. The computer readable medium of claim 25, wherein the at least one color subfield to which the scalar dithering is applied corresponds to a composite color and the at least two color subfields across which the vector dithering process is applied each correspond to component colors.

28. The computer readable medium of claim 25, wherein generating the second set of color subfields includes quantizing interim pixel intensity values for each color subfield based on a number of subframes to be used to display the respective color subfields.

29. The computer readable medium of claim 28, wherein the vector dithering process is a multi-level dithering process.

* * * * *